United States Patent
Sasaki

(10) Patent No.: US 6,419,845 B1
(45) Date of Patent: Jul. 16, 2002

(54) METHOD OF ETCHING MAGNETIC LAYER, OF FORMING MAGNETIC POLE OF THIN FILM MAGNETIC HEAD AND OF MANUFACTURING THIN FILM MAGNETIC HEAD

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/317,200

(22) Filed: May 24, 1999

(30) Foreign Application Priority Data

May 26, 1998 (JP) .......................................... 10-144445

(51) Int. Cl.$^7$ ................................................ B44C 1/22
(52) U.S. Cl. ............................ 216/22; 216/58; 216/66; 216/74; 216/75; 216/76; 216/77; 216/63; 29/603.15; 29/603.13; 29/603.18; 360/324
(58) Field of Search .............................. 216/22, 58, 66, 216/75, 74, 76, 77, 63; 29/603.15, 603.18, 603.13; 360/324

(56) References Cited

U.S. PATENT DOCUMENTS

| 5,438,747 A | | 8/1995 | Krounbi et al. ............... 29/603 |
| 5,607,599 A | * | 3/1997 | Ichihara et al. ............... 216/22 |
| 5,874,010 A | * | 2/1999 | Tao et al. ...................... 216/22 |
| 5,938,941 A | * | 8/1999 | Ishiwata et al. ............... 216/22 |
| 5,966,277 A | * | 10/1999 | Koshikawa et al. ......... 360/126 |
| 6,057,991 A | * | 5/2000 | Ishiwata et al. ............. 360/113 |

FOREIGN PATENT DOCUMENTS

| JP | A-2-44511 | 2/1990 |
| JP | A-7-262519 | 10/1995 |

* cited by examiner

*Primary Examiner*—Randy Gulakowski
*Assistant Examiner*—Michail Kornakov
(74) *Attorney, Agent, or Firm*—Oliff & Berridge, PLC

(57) ABSTRACT

It is an object to provide a method of etching which enables measurement control of the micro width of a magnetic layer while shortening the time required for the etching procedure. An inorganic insulating film made of alumina which is the same material as the write gap layer is formed on a top pole layer by, for example, sputtering method. A photoresist film (first mask) is formed on the inorganic insulating film by photolithography. Next, an inorganic insulating mask (second mask) is formed by selectively etching the inorganic insulating film by reactive ion etching (RIE) using gas etchant such as $CF_4$ (carbon ride), $BCl_3$(boron trichloride), $Cl_2$ (chlorine), $SF_6$ (sulfur hexafluoride) and so on using the photoresist film as a mask. The top layer is selectively removed by, for example, ion milling with Ar (argon) using the inorganic insulating mask.

3 Claims, 20 Drawing Sheets

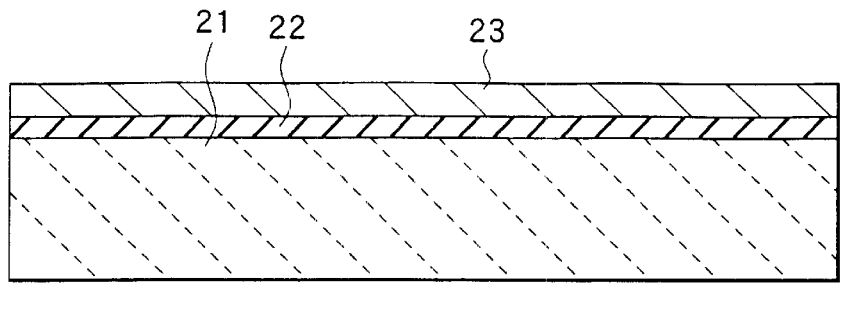 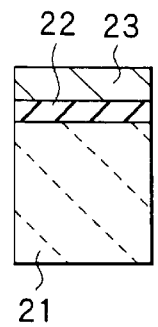
FIG.9A  FIG.9B
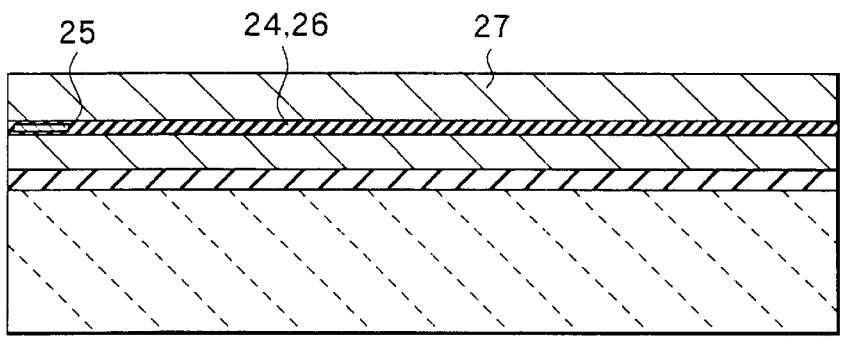 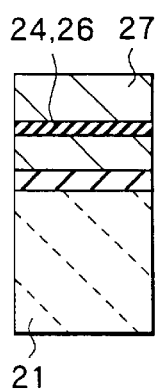
FIG.10A  FIG.10B
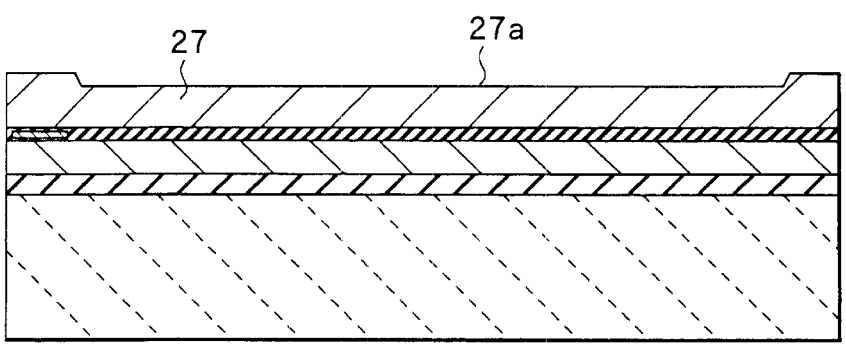 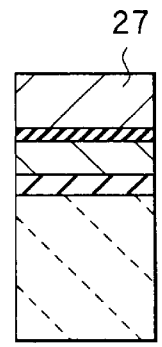
FIG.11A  FIG.11B

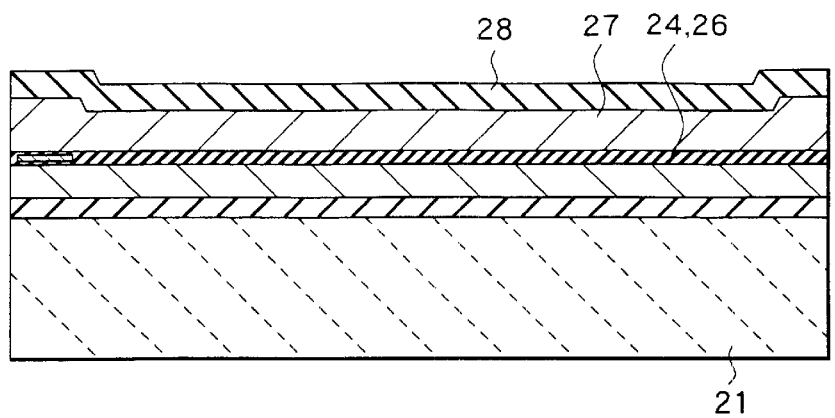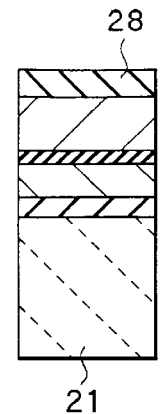
FIG.12A  FIG.12B
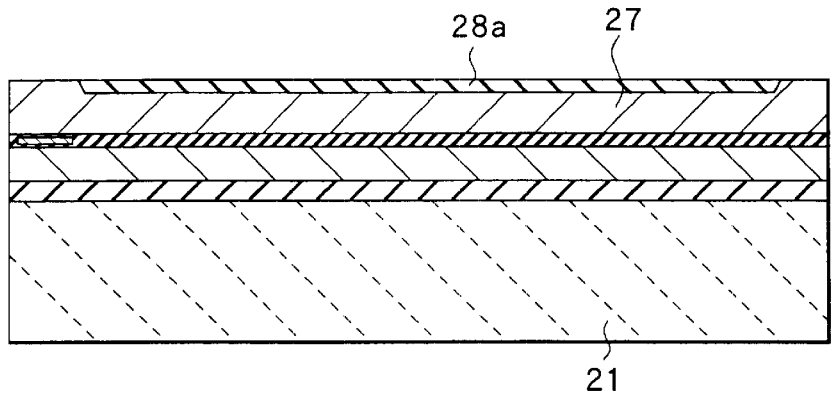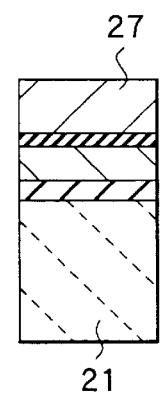
FIG.13A  FIG.13B
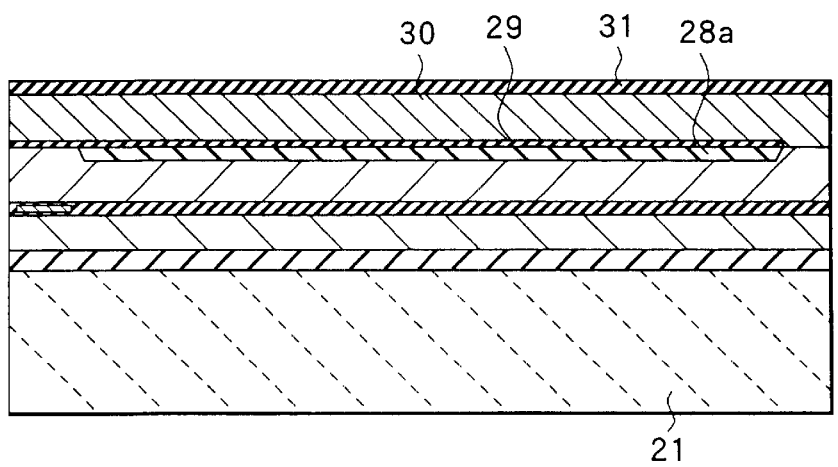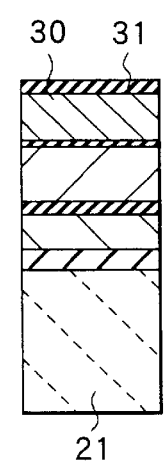
FIG.14A  FIG.14B

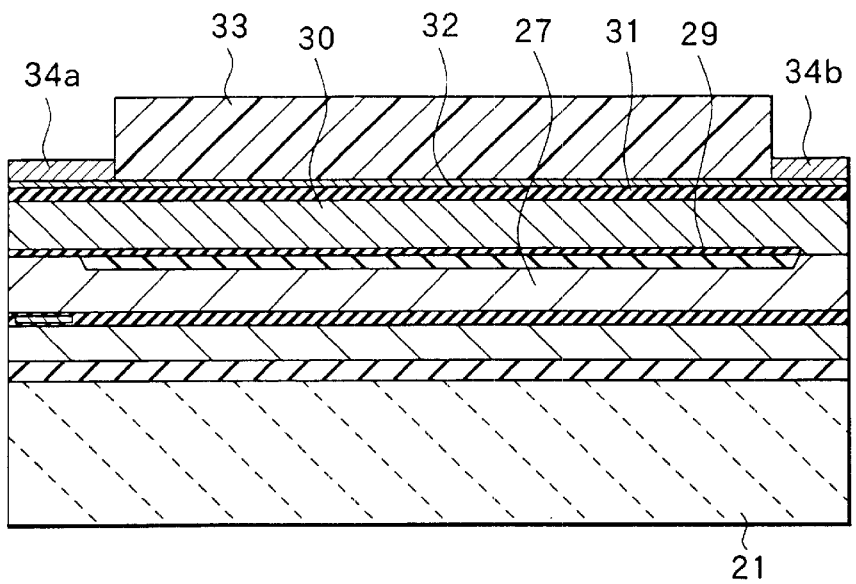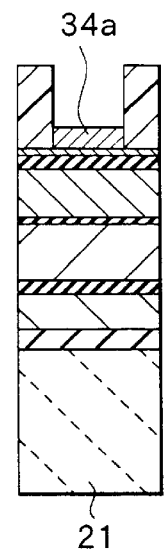
FIG.15A   FIG.15B
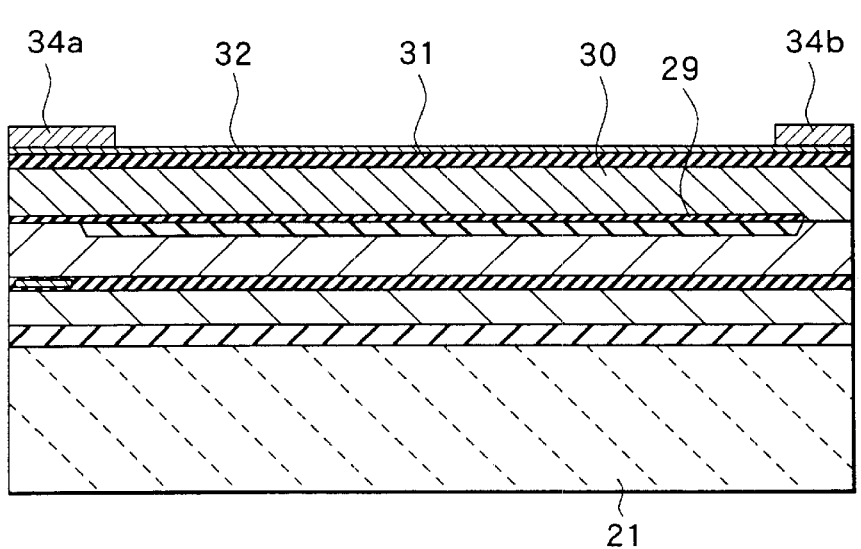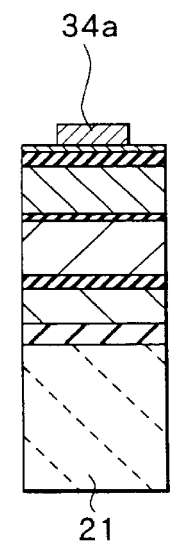
FIG.16A   FIG.16B

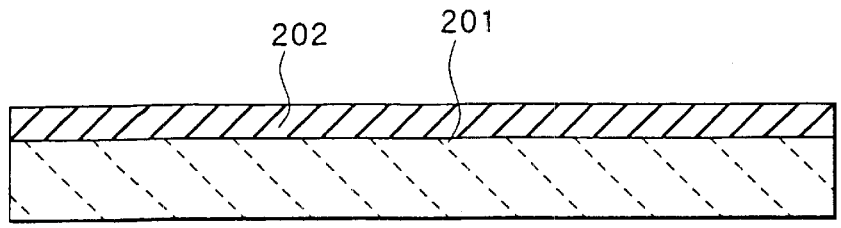
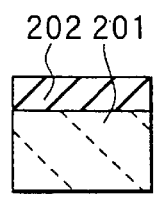
FIG.29A (PRIOR ART)    FIG.29B (PRIOR ART)
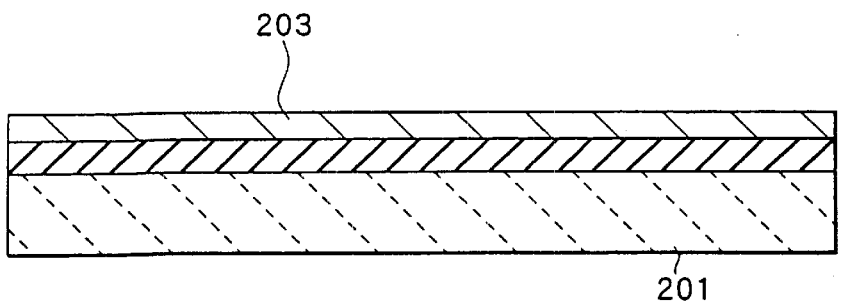
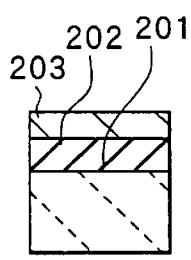
FIG.30A (PRIOR ART)    FIG.30B (PRIOR ART)
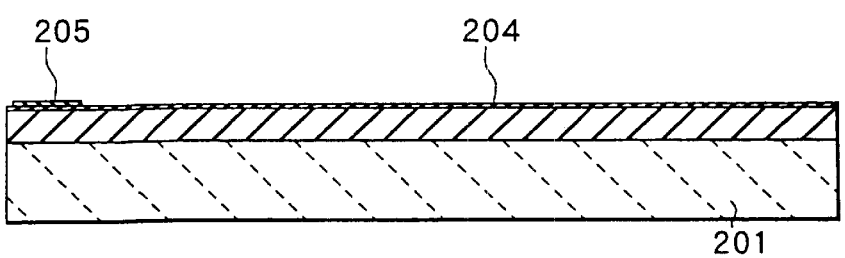
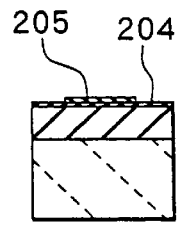
FIG.31A (PRIOR ART)    FIG.31B (PRIOR ART)
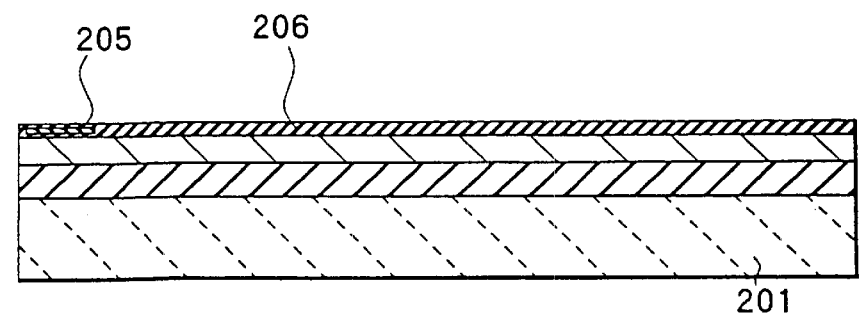
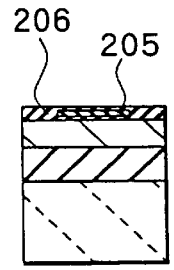
FIG.32A (PRIOR ART)    FIG.32B (PRIOR ART)

US 6,419,845 B1

METHOD OF ETCHING MAGNETIC LAYER, OF FORMING MAGNETIC POLE OF THIN FILM MAGNETIC HEAD AND OF MANUFACTURING THIN FILM MAGNETIC HEAD

BACKGROUND OF THE INVENTION

1. Field of the Invention

The present invention relates to a method of etching a magnetic layer made of high saturated flux density materials, a method of forming a magnetic pole of a thin film magnetic head having at least an inductive-type magnetic transducer for writing and a method of manufacturing a thin film magnetic head.

2. Description of the Related Art

Performance improvement in thin film magnetic heads has been sought in accordance with an increase in surface recording density of a hard disk device. A composite thin film magnetic head, which is made of a layered structure including a recording head with an inductive-type magnetic transducer for writing and a reproducing head with a magnetoresistive (MR) element for reading, is widely used as a thin film magnetic head. As MR elements there are an anisotropic magnetoresistive (AMR) element that utilizes the AMR effect and a giant magnetoresistive (GMR) that utilizes the GMR effect. A reproduction head using the AMR element is called an AMR head or simply an MR head. A reproducing head using the GMR element is called a GMR head. The AMR head is used as a reproducing head whose surface recording density is more than 1 gigabit per square inch. The GMR head is used as a reproducing head whose surface recording density is more than 3 gigabit per square inch.

The AMR head includes an AMR film having the AMR effect. In the GMR head, the AMR film is replaced with a GMR film having the GMR effect and the configuration of the GMR head is similar to that of the AMR head. However, the GMR film exhibits a greater change in resistance under a specific external magnetic field compared to the AMR film. Therefore, the reproducing output of the GMR head is about three to five times as great as that of the AMR head.

The MR film may be changed in order to improve the performance of a reproducing head. In general, the AMR film is made of a magnetic substance that exhibits the MR effect and has a single-layered structure. In contrast, many of the GMR films have a multi-layered structure consisting of a plurality of films. There are several types of mechanisms which produce the GMR effect and the layer structure of the GMR film changes depending on the mechanism. The GMR films include a superlattice GMR film, a granular film, a spin valve film and so on. The spin valve film is most efficient for the GMR film which has a relatively simple structure, exhibits a great change in resistance in a low magnetic field, and is suitable for mass production. The performance of a reproducing head is thus easily improved by, for example, changing the MR film from the AMR film to the GMR film and so on which are the materials with an excellent magnetoresistive sensitivity.

As a primary factor for determining the performance of a recording head, there is a pattern width, especially an MR height, in addition to the selection of a material described above. The MR height is the length (height) between the end of an MR element closer to an air bearing surface and the other end. The MR height is originally controlled by an amount of grinding when the air bearing surface is processed. The air bearing surface (ABS) here is a surface of a thin film magnetic head that faces a magnetic recording medium and is also called a track surface.

Performance improvement in a recording head has also been expected in accordance with the performance improvement in a reproducing head. It is required to increase the track density of a magnetic recording medium in order to increase the recording density among the performance of a recording head. In order to achieve this, a recording head of a narrow track structure in which the width of a bottom pole and a top pole being formed sandwiching a write gap on the air bearing surface is required to be reduced to the order of few microns to submicron. Semiconductor process technique is used to achieve the narrow track structure.

Another factor for determining the performance of a recording head is the throat height (TH). The throat height is the length (height) of a portion (magnetic pole portion) which is from the air bearing surface to an edge of an insulating layer which electrically isolates the thin film coil. Reducing the throat height is desired in order to improve the performance of a recording head. The throat height is also controlled by an amount of grinding when the air bearing surface is processed.

In order to improve the performance of a thin film magnetic head, it is important to form a recording head and a reproducing head in well balance as described.

Here, a cross sectional configuration of a composite thin film magnetic head as an example of a thin film magnetic head of the related art is described with reference to FIG. 28A and FIG. 28B. In FIG. 28, "A" shows a cross section vertical to a track surface and "B" shows a cross section of a magnetic pole portion parallel to the track surface. The magnetic head 100 comprises a magnetoresistive reading head portion (called a reading head portion in the following) 100A for reproducing and an inductive recording head (called a recording head in the following) 100B for recording.

The reading head portion 100A is a pattern of a magnetoresistive layer (called an MR layer in the following) 105 being formed on a substrate 101 made of, for example, ALTIC ($Al_2O_3 \cdot TiC$) through an undercoating layer 102 formed with, for example, alumina (aluminum oxide, $Al_2O_3$), a bottom shield layer 103 formed with, for example, ferrous aluminum silicide (FeAlSi), and a shield gap layer 104 formed with, for example, aluminum oxide ($AM_2O$., called alumina in the following) in order. Further, a lead terminal layer 105a made of a material which does not diffuse into the MR films such as tantalum (Ta), tungsten (W) and so on is formed on the shield gap layer 104. The lead terminal layer 105a is electrically connected to an MR layer 105. The MR layer 105 is formed with various kinds of materials having magnetoresistive effect such as permalloy (NiFe alloy), nickel (Ni)—cobalt (Co) alloy and so on. A shield gap layer 106 made of, for example, alumina is laminated on the MR layer 105 and the lead terminal layer 105a. That is, the MR layer 105 and the lead terminal layer 105a are buried between the shield gap layers 104 and 106.

The recording head portion 100B comprises a top pole 109a being formed on the reading head portion 100A through a bottom pole 107 which functions as a top shield layer of the MR layer 105 and a gap layer 108. An insulating layer 110 is formed on the gap layer 108, and a first layer of a thin film coil 111 and a second layer of a thin film coil 112 are laminated on the insulating layer 110. The thin film coils 111 and 112 are respectively formed on the shield layers lila and 112a by plating method. The thin film coils 111 and 112 are covered with the insulating layers 113 and 114. A top pole layer 109 including the top pole 109a is formed on the insulating layers 110, 113 and 114. The top pole layer 109 is covered with an overcoat layer 115. In the recording head portion 100B, a bottom pole 107a facing the top pole 109a has a trim structure in which part of the surface of the top shield layer 107 is processed to be protruded.

In the magnetic head 100, reading-out of information from a magnetic disk which is not shown in figure is performed in the recording head portion 100A using magnetoresistive effect of the MR layer 105, while writing of information to a magnetic disk is performed in the recording portion 100B using a change in magnetic flux between the top pole 109a and the bottom pole 107a.

FIG. 29A and FIG. 29B to FIG. 38 show an example of a method of manufacturing another composite thin film magnetic head of the related art.

First, as shown in FIG. 29A and FIG. 29B, an insulating layer 202 made of, for example, alumina (aluminum oxide, $Al_2O_3$) of about 5–10 μm in thickness is deposited on a substrate 201 made of, for example, altic ($Al_2O_3 \cdot TiC$).

Next, as shown in FIG. 30A and FIG. 30B, a bottom shield layer 203 for a reproducing head is formed on the insulating layer 202.

Next, as shown in FIG. 31A and FIG. 31B, a shield gap film 204 is formed on the bottom shield layer 203 by depositing, for example, alumina about 40–50 nm in thickness. Next, an MR film 205 of tens of nanometers in thickness for composing an MR element for reproduction is formed on the shield gap film 204, and photolithography with high precision is applied to obtain a desired shape.

Next, as shown in FIG. 32A and FIG. 32B, a shield gap film 206 is formed on the shield gap film 204 and the MR film 205, and the MR film 205 is buried in the shield gap films 204 and 206.

Next, as shown in FIG. 33A and FIG. 33B, a top shield-cum-bottom pole (called a bottom pole in the following) 207 made of, for example, permalloy (NiFe) which is a magnetic material used for both the reproducing head and the reading head is formed on the shield gap film 206. Next, a write gap layer 208 made of insulating film such as alumina film is formed on the bottom pole 207. Further, an opening for connecting the top pole and the bottom pole is formed through patterning the write gap layer 208 by photolithography. Next, a pole tip 209 and a connecting portion pattern 209a of the top pole and the bottom pole is formed with a magnetic material made of permalloy (NiFe) by plating method. The bottom pole 207 and a top pole 216 which is to be described later are connected through the connecting portion pattern 209a so that forming a through-hole after CMP (Chemical and Mechanical Polishing) which is to be described later becomes easier. Next, the write gap layer 208 and the bottom pole 207 are etched about 0.3–0.5 μm by ion milling using the pole tip 209 as a mask. By etching the bottom pole 207, widening of effective writing track width can be suppressed (that is, spread of magnetic flux in the bottom pole can be suppressed when writing data).

Further, as shown in FIG. 34A and FIG. 34B, an insulating film 210 of about 3 μm in thickness made of, for example, alumina is formed all over the surface before flattening the whole surface by CMP. Then, a photoresist film 211 is formed on the insulating film 210 by photolithography with high precision. Next, a first layer of a thin film coil 212 for an inductive-type recording head made of, for example, copper (Cu) is selectively formed on the photoresist film 211 by, for example, plating method.

Next, as shown in FIG. 35A and FIG. 35B, a photoresist film 213 is formed in a desired pattern on the photoresist film 211 and the thin film coil 212 by photolithography with high precision. Further, a heat treatment is applied so as to flatten the thin film coil 212 and to isolate the turns of the thin film coil 212 from each other.

Next, as shown in FIG. 36A and FIG. 36B, a second layer of a thin film coil 214 made of for example, copper is formed on the photoresist film 213 by, for example, plating method. Next, a photoresist film 215 is formed in a predetermined shape on the photoresist film 213 and the thin film coil 214 by photolithography with high precision. A heat treatment is applied so as to flatten the thin film coil 214 and to isolate the turns of the thin film coil 214 from each other.

Next, as shown in FIG. 37A and FIG. 37B, a top yoke-cum-top pole (called a top pole in the following) 216 made of a magnetic material such as permalloy for a recording head is formed on the pole tip 209, the photoresist films 211, 213 and 215. The top pole 216 has a contact with the bottom pole 207 in a rear position of the thin film coils 212 and 214, and is magnetically coupled to the bottom pole 207. Further, an overcoat layer 217 made of, for example, alumina is formed on the top pole 216. At last, a thin film magnetic head is completed after forming a track surface (air bearing surface) 218 of a recording head and a reproducing head by performing a machine processing on a slider.

FIG. 38 and FIG. 39 show a complete state of a thin film magnetic head. FIG. 38 shows a cross section of a thin film magnetic head vertical to the track surface 218 and FIG. 39 shows an enlarged cross section of the pole portion parallel to the track surface 218. In FIG. 38, TH represents the throat height and MR-H represents the MR height. Further, in FIG. 39, P2W represents a pole width and P2L represents a pole thickness.

As an factor for determining the performance of a thin film magnetic head, there is an apex angle as represented by θ in FIG. 38 besides the throat height, the MR height and so on. The apex angle is an angle between a line connecting a corner of the side surface on the track surface side of the photoresist films 211, 213 and 215, and the upper surface of the top pole 216.

As shown in FIG. 39, a structure in which part of each sidewall of the pole tip 209, the write gap layer 208 and bottom pole 207 is formed in a self-aligned manner is called a trim structure as described above. With the trim structure, increase of the effective track width caused by spread of the magnetic flux occurred while writing of the narrow track can be suppressed. Further, as shown in FIG. 39, a lead layer 205*a* is provided on the side of the MR film 205.

To improve the performance of a thin film magnetic head, it is important to precisely form the throat height TH, the MR height MR-H, the apex angle θ, the track width (pole width) P2W and the pole length P2L as shown in FIG. 38 and FIG. 39.

In this application, problems regarding controls of the track width is being focused specifically.

The track width P2W is required to be precisely formed since it determines the track width of a recording head. Especially these days, for enabling high surface density writing, that is to form a recording head with a narrow track structure, measurement of 1.0 μm or less is required. In order to achieve this, the pole tip 209 and the top pole 216, which determine the track width, are required to be minutely formed.

As a method of forming a top pole, frame plating method is used as claimed in, for example, Japanese Patent Application Laid-open Hei 7-262519. In a case where the top pole is formed using frame plating method, first, a thin electrode film (not shown in figure) made of, for example, permalloy is formed all over the coil portion (called apex area) which is protruded like a mountain by being covered with the photoresist films (for example, photoresist films 110, 113 and 114 in FIG. 28A and FIG. 28B). Next, a frame (outer frame) for plating is formed through applying photoresist on the electrode film and patterning it by photolithography. Further, the top pole is formed by plating method having the electrode film formed earlier as a seed layer.

By the way, there is a difference of 7–10 μm or more in heights in the apex area. Photoresist of 3–4 μm in thickness is applied onto the apex area. If the film thickness of the photoresist on the apex area is required to be at least 3 μm or more, a photo resist film of about, for example, 8–10 μm or more in thickness is formed in the lower part of the apex area since photoresist with liquidity gathers in a lower area.

To form a narrow track as described above, a pattern of about 1.0 μm in width is required to be formed by the photoresist film. Accordingly, a micro pattern of about 1.0 μm in width is required to be formed by the photoresist film of 8–10 μm or more in thickness, however, it is extremely difficult.

Further, during exposure of photolithography, a light for the exposure reflects by the electrode film made of, for example, permalloy and the photoresist is exposed also by the reflecting light resulting in deformation and so on of the photoresist pattern. As a result, the top pole can not be formed in a desired shape, which means, for example, its sidewalls take a round-shape and so on. As described, it is extremely difficult with the related art to form the top pole with high precision for obtaining a narrow track structure by precisely controlling the track width P2W.

For the reasons described, as shown in FIG. 29A and FIG. 29B to FIG. 37A and FIG. 37B, a method of connecting the pole tip 209 and the top pole 216, which is to be a yoke, after forming a track width of 1.0 μm or less on the pole tip 209, which is effective for forming the narrow track of the recording head, is used. That is, a method of dividing the top pole 109 (FIG. 28A and FIG. 28B) into the pole tip 209 for determining the track width and the top pole (yoke) 216 for inducing the magnetic flux is employed.

However, there are problems as follows especially on the recording head side, even in a thin film magnetic head manufactured through the method as described. As a result, performance improvement of the recording head may be suppressed.

That is, ion milling used in a case where a narrow track is formed by etching a magnetic layer (pole tip 209 in FIG. 33A and FIG. 33B). However, during the procedure, the photoresist is also etched by a large amount through ion milling since the photoresist is used as a mask. Accordingly, there is a problem that a large difference in the etching profile in the etched magnetic layer occurs. As a result, the pole tip 209 takes a shape with taper so that control of micro measurement such as half-micron or micro-micron is substantially impossible. Further, in a case where the photoresist film is used as a mask of the magnetic layer, a light for exposure reflects from the magnetic layer during photolithography and the photoresist is exposed also by the reflecting light resulting in a problem that exposure precision is deteriorated.

To overcome such problems of the photoresist mask, a method of manufacturing a thin film magnetic head in which an inorganic material is used for a mask of the magnetic layer (Japanese Patent Laid-open Hei 2-44511) is proposed. In the method, an inorganic mask layer is formed on the top pole and an inorganic mask is formed through etching the mask layer by ion milling (ion beam) having the photoresist film as a mask. Further, the top pole is etched to a predetermined shape by ion milling (ion beam) through the inorganic mask.

With the method, the problems of a case where the photoresist mask described above is used are solved. However, in the method of the related art, there is a problem that the etching procedure of the inorganic mask takes too long and etching of the magnetic layer takes extremely a long time to complete, since the same ion milling method as the etching method of the magnetic layer is used in order to form the inorganic mask.

The invention is designed to overcome the foregoing problems. The object is to provide a method of etching a magnetic layer which is possible to control measurement of micro width of the magnetic layer while shortening the etching procedure, a method forming the magnetic pole of a thin film magnetic head and a method of manufacturing a thin film magnetic head.

SUMMARY OF THE INVENTION

A method of etching a magnetic layer of the invention includes the steps of. forming an inorganic insulating mm on the surface of the magnetic layer; forming a first mask on the surface of the inorganic insulating film; forming a second mask by selectively removing the inorganic insulating film through reactive ion etching using the first mask; and selectively removing the magnetic layer using the second mask.

A method of forming a magnetic pole of a thin film magnetic head of the invention is a method of forming a thin film magnetic head having two magnetic layers including a first magnetic pole and a second magnetic pole being magnetically coupled to each other, while part of sides of which facing a recording medium oppose each other through a write gap layer. The method includes the steps of: forming a magnetic layer corresponding to either the first or the second magnetic pole before forming an inorganic insulating film on a surface of the magnetic layer; forming a first mask on the surface of the inorganic insulating film; forming a second mask by selectively removing the inorganic insulating film through reactive ion etching using the first mask; and forming at least either the first magnetic pole or the second magnetic pole by selectively removing the magnetic layer using the second mask.

A method of manufacturing a thin film magnetic head of the invention is a method of manufacturing a thin film magnetic head having a first magnetic layer and a second magnetic layer made of at least one layer respectively including a first magnetic pole and a second magnetic pole being magnetically coupled to each other, while part of sides of which facing a recording medium oppose each other through a write gap layer, and a thin film coil provided between the first magnetic layer and the second magnetic layer. The method includes the steps of: forming a first magnetic layer corresponding to the first magnetic pole; forming a gap layer on the first magnetic layer; forming a thin film coil on the gap layer; and forming the second magnetic layer corresponding to the second magnetic pole; wherein: the step of forming the second magnetic layer includes the steps of: forming a magnetic layer corresponding to the second magnetic pole before forming an inorganic insulating film on a surface of the magnetic layer; forming a first mask on a surface of the inorganic insulating film; forming a second mask by selectively removing the inorganic insulating layer through reactive ion etching using the first mask; and forming at least a second magnetic pole by selectively removing the magnetic layer using the second mask.

In a method of etching a magnetic layer, a method of forming a magnetic pole of a thin film magnetic head and a method of manufacturing a thin film magnetic head of the invention, a second mask made of an inorganic insulating film is formed by reactive ion etching using a first mask, and etching of a magnetic layer (a second magnetic layer) is performed using the second mask.

The first mask is formed with, specifically, a photoresist film or a plating film. The inorganic insulating film is formed with, for example, aluminum oxide (alumina, $Al_2O_3$) or silicon dioxide ($SiO_2$). The magnetic layer is preferable to be formed with a magnetic material with high saturation flux density such as permalloy (NiFe) and so on. Further, etching of the magnetic layer using the second mask is preferable to be performed by ion milling method.

BRIEF DESCRIPTION OF THE DRAWINGS

FIG. 9A and FIG. 9B are cross sections for describing a method of manufacturing a thin film magnetic head according to the third embodiment of the invention.

FIG. 10A and FIG. 10B are cross sections for describing a procedure following FIG. 9A and FIG. 9B.

FIG. 11A and FIG. 11B are cross sections for describing a procedure following FIG. 10A and FIG. 10B.

FIG. 12A and FIG. 12B are cross sections for describing a procedure following FIG. 11A and FIG. 11B.

FIG. 13A and FIG. 13B are cross sections for describing a procedure following FIG. 12A and FIG. 12B.

FIG. 14A and FIG. 14B are cross sections for describing a procedure following FIG. 13A and FIG. 13B.

FIG. 15A and FIG. 15B are cross sections for describing a procedure following FIG. 14B and FIG. 14B.

FIG. 16A and FIG. 16B are cross sections for describing a procedure following FIG. 15A and FIG. 15B.

FIG. 29A and FIG. 29B are cross sections for describing another method of manufacturing a thin film magnetic head of the related art.

FIG. 30A and FIG. 30B are cross sections for describing a procedure following FIG. 29A and FIG. 29B.

FIG. 31A and FIG. 31B are cross sections for describing a procedure following FIG. 30A and FIG. 30B.

FIG. 32A and FIG. 32B are cross sections for describing a procedure following FIG. 31A and FIG. 31B.

FIG. 37A and FIG. 37B are cross sections for describing a procedure following FIG. 36A and FIG. 36B.

DETAILED DESCRIPTION OF THE PREFERRED EMBODIMENTS

First Embodiment

First, a method of forming a magnetic pole of a thin film magnetic head according to a first embodiment of the invention will be described with reference to FIG. 1 to FIG. 4. In the embodiment, an example to which the invention is applied when forming a recording track of a thin film magnetic head will be described. A method of etching a magnetic layer of the invention will together be described here since it is included in the embodiment.

Figure 1:
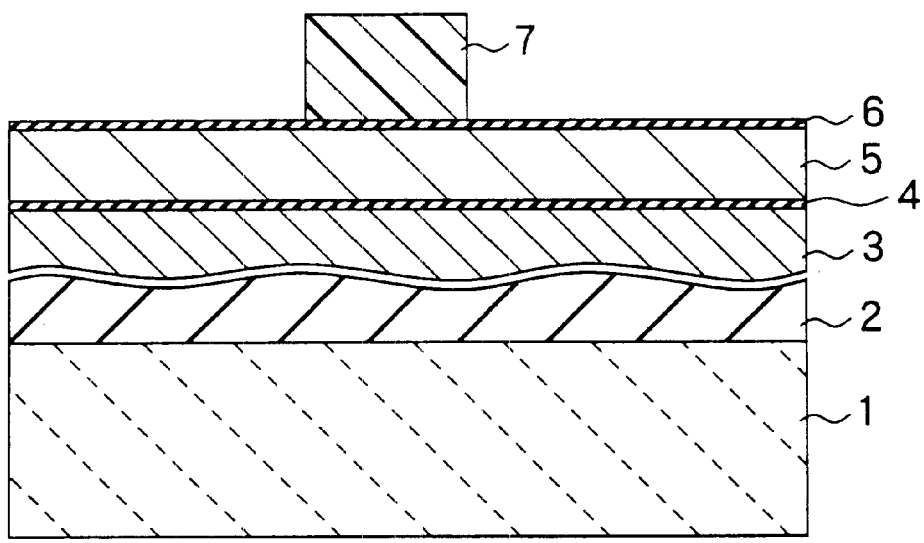
FIG. 1 is a cross section for describing a method of etching a magnetic layer according to the first embodiment of the invention.

In the embodiment, as shown in FIG. 1, an insulating layer 2 made of, for example, alumina is formed in thickness of about 3–5 $\mu$m on a substrate 1 made of, for example, attic ($Al_2O_3 \cdot TiC$) by sputtering method. Further, however not shown in figure, after forming a bottom shield layer, a write gap layer, an MR element, a GMR element and so on, a magnetic layer such as a top shield-cum-bottom pole (called a bottom pole in the following) 3 made of, for example, permalloy is selectively formed in thickness of about 3–4 $\mu$m. The bottom pole 3 corresponds to a specific example of the first magnetic pole and the first magnetic layer of the invention. Further, a write gap layer 4 of about 0.2–0.4 $\mu$m in thickness, made of an insulating film such as an alumina film, is formed by, for example, sputtering method and a top pole layer 5 of about 0.2–0.4 $\mu$m in thickness, which determines a track width, is formed on the write gap layer 4 by, for example, sputtering method. As composing materials of the top pole layer 5, for example, high saturation flux density (Hi-Bs) materials such as FeN (ferrous nitride), FeZrN (ferrous zirconia nitride), FeCoZr (ferrous cobalt zirconia) and so on are used besides permalloy (NiFe) such as NiFe (Ni: 50 weight percentage, Fe: 50 weight percentage), NiFe (Ni: 80 weight percentage, Fe: 20 weight percentage). The top pole layer 5 corresponds to an example of the second magnetic pole and the second magnetic layer of the invention.

Further, an inorganic insulating film 6 of about 0.3–0.7 $\mu$m in film thickness, made of, for example, the same material as the write gap layer is formed on the top pole layer 5 by, for example, sputtering method. The inorganic insulating film 6 becomes the material for the etching mask of the top pole layer 5. Further, a pattern of a photoresist film 7 as the first mask of the invention is formed on the inorganic insulating film 6 by photolithography. As a light for the exposure of the photolithography, for example, i-rays (wavelength of 365 nm) is used, however, it is not limited to this. G-rays (wavelength of 436 nm), a broadband light of i-ray cut, a broadband light, ultra violet rays, a laser light of an excimer laser, x-rays, an electron beam and so on may be used as well.

Figure 2:
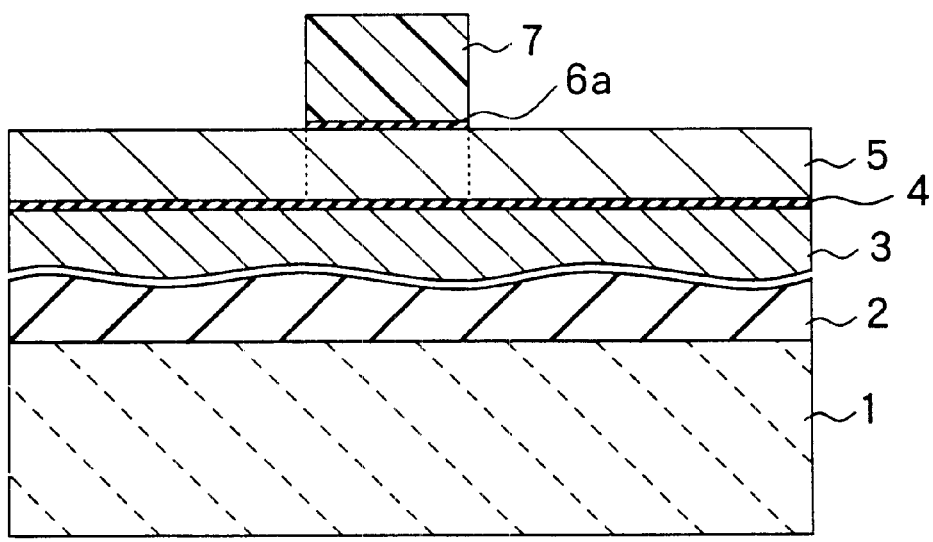
FIG. 2 is a cross section for describing a procedure following FIG. 1.

Next, in the embodiment, as shown in FIG. 2, an inorganic insulating mask 6a as the second mask of the invention is formed through selectively removing the inorganic insulating film 6 by reactive ion etching (called RIE in the following) using gas etchant such as $CF_4$ (carbon tetrafluoride), $BCl_3$ (boron trichroline), $Cl_2$ (chlorine), $SF_6$ (sulfur hexafluoride) and so on having the photoresist film 7 as a mask. The inorganic insulating mask 6a may be formed with silicon dioxide ($SiO_2$) and so on besides alumina.

Figure 3:
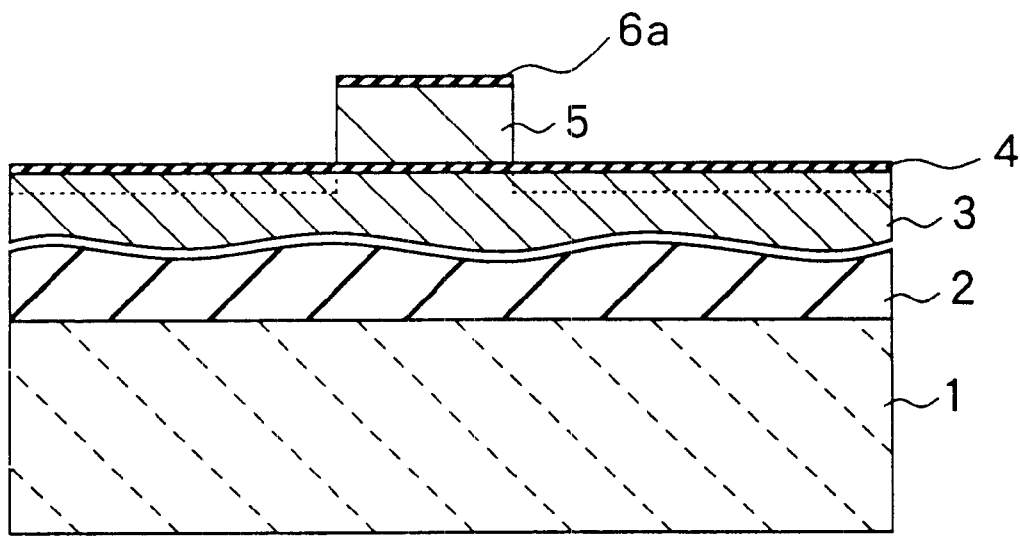
FIG. 3 is a cross section for describing a procedure following FIG. 2.

Next, as shown in FIG. 3, the top pole layer 5 is selectively removed by ion milling with, for example, Ar (argon) using the inorganic insulating mask 6a. The photoresist film 7 may be removed when performing ion milling of the top pole layer 5 or may be used as a mask material for ion milling together with the inorganic insulating mask 6a.

Figure 4:
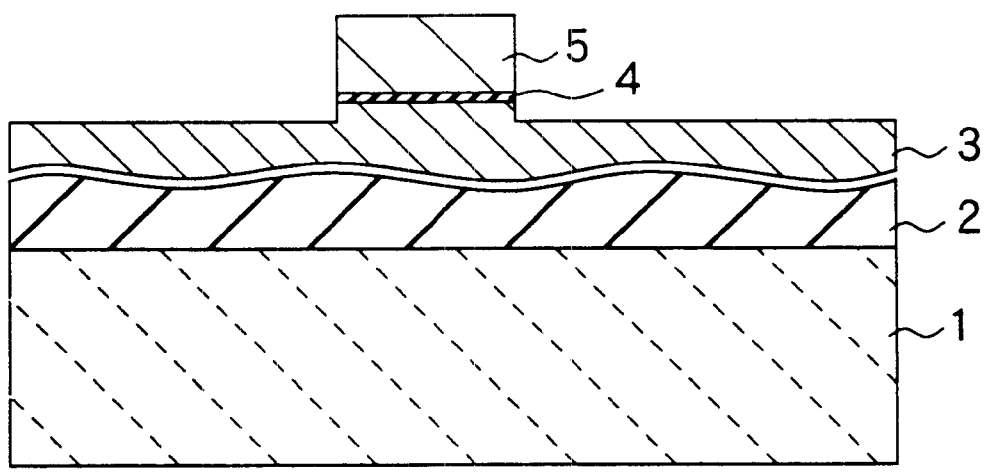
FIG. 4 is a cross section for describing a method of etching a magnetic layer according to the second embodiment of the invention.
Figure 5:
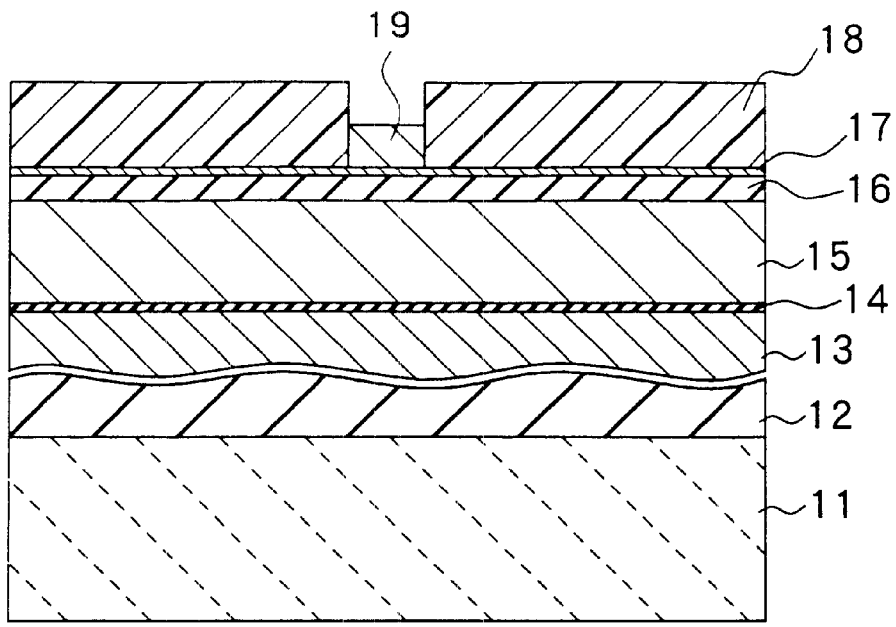
FIG. 5 is a cross section for describing a procedure following FIG. 4.

Further, as shown in FIG. 4, a trim structure is formed through selectively removing the write gap layer 4 by RIE having the inorganic insulating mask 6a as a mask and, further, etching the surface of the bottom pole 3 about 0.5 $\mu$m by ion milling with, for example, Ar (argon).

In the embodiment as described, the top pole layer 5 made of high saturation flux density (Hi-Bs) material can be formed into submicron measurement with high precision since the inorganic insulating mask 6a is used as an etching mask of the magnetic layers (top pole layer 5 and bottom pole 3), instead of using photoresist as in the related art.

Further, as described above, in a case where the photoresist film is used as a mask of the magnetic layer, a light for the exposure reflects from the magnetic layer during photolithography and directly irradiates into the photoresist film resulting in deterioration of the exposure precision. Accordingly, it is difficult to form the mask itself to submicron measurement. In contrast, in the embodiment, the inorganic film such as alumina and so on absorb most of the light when performing patterning of the photoresist film (first mask) formed on the inorganic insulating film. As a result, the reflecting light to the photoresist film is suppressed so that the exposure precision does not deteriorate. Accordingly, the photoresist mask (first mask) can be formed with high precision resulting in improving the processing precision of the inorganic insulating mask (second mask) and the magnetic layer.

Further, the embodiment has such effects as follows. If the inorganic insulating mask 6a made of such as alumina is etched by the same ion milling as etching of the magnetic layer, the etching speed is much slower comparing to ion milling of the photoresist. In contrast, in the embodiment, the inorganic insulating mask 6a is formed by RIE which is a combination of physical etching and chemical etching, unlike physical ion milling of the related art. The RIE generally performs with high processing precision at high speed comparing to ion milling. Accordingly, the inorganic insulating mask 6a can be formed with high precision at high speed. As a result, the time of forming the inorganic insulating mask until completing etching the magnetic layer (top pole layer 5) by ion milling can be extremely shortened. Incidentally, in a case where ion milling is used respectively for etching the inorganic insulating mask as the related art and for etching of the magnetic layer using the inorganic insulating mask, the track width P2W is limited to 1.9 μm. In contrast, in the embodiment, by combining the two methods such as RIE for the inorganic insulating mask and ion milling for the magnetic layer, the track width can be formed to 1.71 μm or less and, at the same time, the time required for etching can be shortened to about one half or one third of the time required in the method of the related art.

Further, as a method of etching the magnetic layer using the inorganic insulating mask, ion milling is used in the embodiment, however, another method such as RIE can be used as in the case of forming the inorganic insulating mask. However, there is a problem of reattachment of the scattered magnetic material with the method, so that it is preferable to remove the reattached magnetic material by ion milling after etching the magnetic layer by RIE once.

Second Embodiment

Next, a second embodiment of the invention will be described with reference to FIG. 5 to FIG. 8. The embodiment is concerning a method of forming a recording track of a thin film magnetic head like the first embodiment. However, the method uses a plating film as a first mask instead of using photoresist, which makes it preferable to be used in a case where the film thickness of the magnetic layer, which is to be etched, is relatively thick.

In the embodiment, like the embodiment described above, an insulating layer 12 made of, for example, alumina ($Al_2O_3$) is formed in thickness of about 3–5 μm on a substrate 11 made of, for example, altic ($Al_2O_3 \cdot TiC$) by sputtering method (called sputtering method in the following). Further, however not shown in figure, after forming a bottom shield layer, a write gap layer, an MR element, a GMR element and so on, a magnetic layer such as a top shield-cum-bottom pole (called a bottom pole in the following) 13 made of, for example, permalloy is selectively formed in thickness of about 3–4 μm. Further, a write gap layer 14 made of an insulating film such as an alumina film of about 0.2–0.4 μm in thickness is formed, and a top pole layer 15 of about 0.2–0.4 μm in thickness, which determines a track width, is formed on the write gap layer 14 by, for example, sputtering method.

Further, like the first embodiment, an inorganic insulating film 16 of about 0.8–1.5 μm in thickness, made of, for example, the same material as the write gap layer is formed on the top pole layer 15 by, for example, sputtering method. The inorganic insulating film 16 becomes the material for the etching mask of the top pole layer 15. Next, after forming a seed layer 17 for plating of about 50 nm in thickness is formed on the inorganic insulating film 16, a pattern of a photoresist film 18 is formed on the seed layer 17 by photolithography.

Further, a plating layer 19 made of, for example, permalloy (NiFe) of about 0.5–1.0 μm in thickness is selectively formed by electro plating method having the photoresist film 18 as a mask. The plating layer 19 corresponds to an example of the first mask of the invention. Here, electro plating method is used, however, a plating layer may be formed with NiB, NiP, NiWB, NiWP and so on instead of permalloy using electroless plating method. A seed layer is not required with this method.

Figure 6:
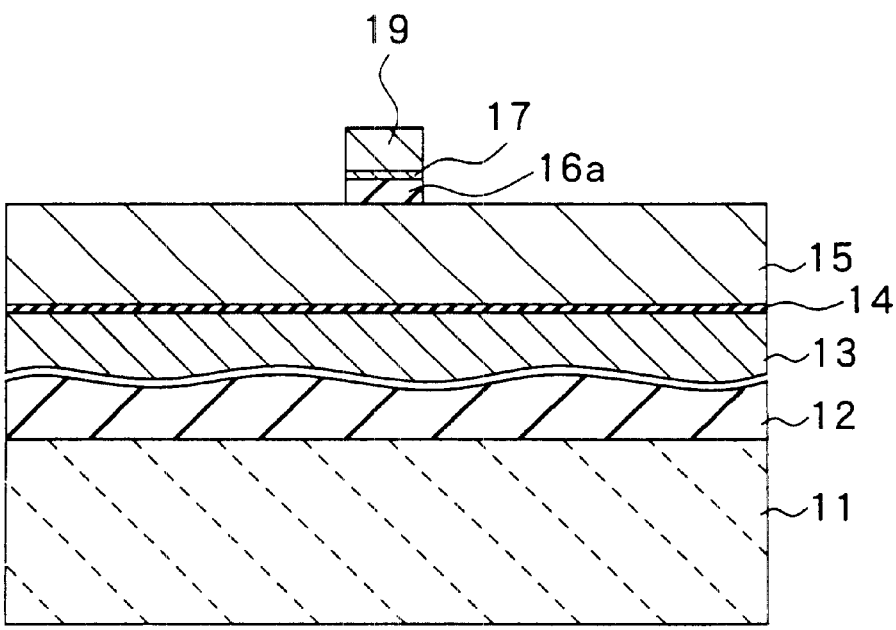
FIG. 6 is a cross section for describing a procedure following FIG. 5.

Next, after removing the photoresist film 18, as shown in FIG. 6, an inorganic insulating mask 16a as a second mask is formed through selectively removing the inorganic insulating film 16 by RIE using the plating layer 19 as a mask, after removing the seed layer 17 by ion milling using the plating layer 19 as a mask. By RIE using the plating layer 19 as a mask, etching the thick inorganic insulating film 16 into submicron measurement becomes possible.

Figure 7:
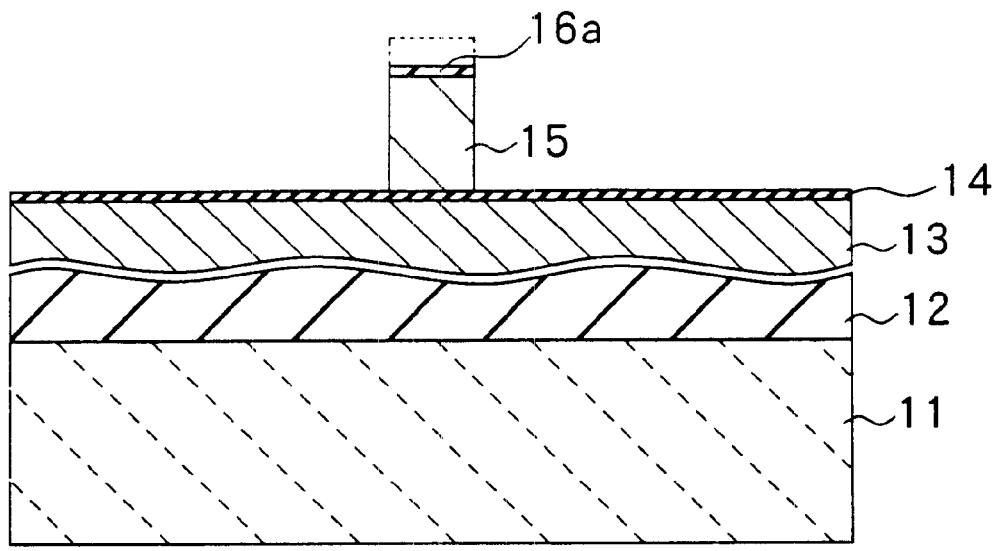
FIG. 7 is a cross section for describing a procedure following FIG. 6.

Next, as shown in FIG. 7, like the first embodiment, the top pole layer 15 is selectively etched by, for example, ion milling with Ar using the inorganic insulating mask 16a. At this time, the surface of the inorganic insulating mask 16a is also etched and its film thickness becomes thin.

Figure 8:
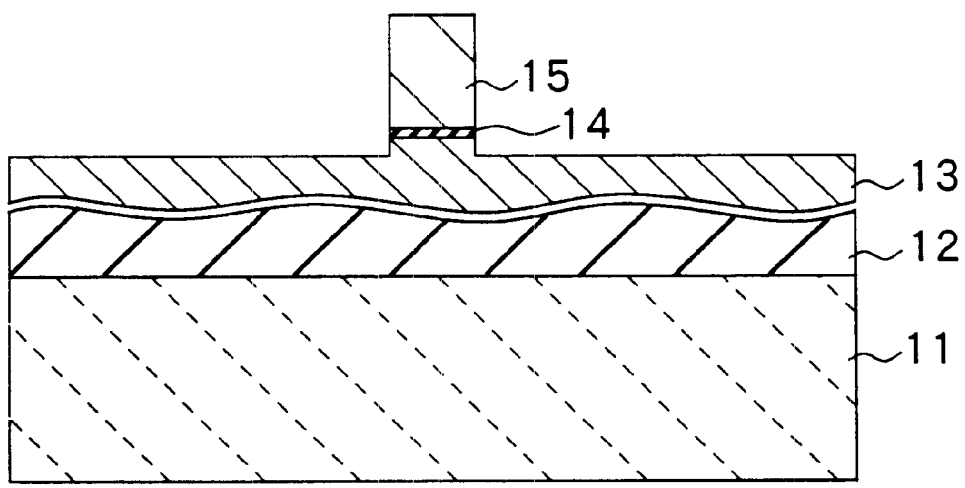
FIG. 8 is a cross section for describing a procedure following FIG. 7.

Further, as shown in FIG. 8, a trim structure is formed by etching the surface of the bottom pole 13 about 0.5 μm by, for example, ion milling with Ar after selectively removing the write gap layer 14 by RIE.

In the embodiment, like the first embodiment, the magnetic layer (top pole layer 15) can be formed into submicron measurement with high precision even in a case where the film thickness of the magnetic layer which is the subject of etching is relatively thick. Other effects are identical to those of the first embodiment.

Third Embodiment

Next, a method of manufacturing a composite thin film magnetic head as a method of manufacturing a thin film magnetic head according to a third embodiment of the invention will be described with reference to FIG. 9A and FIG. 9B to FIG. 21A and FIG. 21B. In FIG. 9A and FIG. 9B to FIG. 21A and FIG. 21B, "A"s show cross sections vertical to the track surface, and "B"s show cross sections parallel to the track surface of the magnetic pole portion respectively.

In the manufacturing method according to the embodiment, first, as shown in FIG. 9A and FIG. 9B, an insulating layer 22 made of, for example, alumina ($Al_2O_3$) is formed in thickness of about 3–5 μm on a substrate 21 made of, for example, altic ($Al_2O_3TiC$) by, for example, sputtering method. Next, a bottom shield layer 23 f or a reproducing head is formed on the insulating layer 22 by selectively forming permalloy (NiFe) of about 3 u m in thickness by plating method using photoresist film as a mask. Further, an alumina film (not shown in figure) of about 4–6 μm in thickness is formed by, for example, sputter or CVD (Chemical Vapor Deposition) method and is flattened by CMP (Chemical and Mechanical Polishing).

Next, as shown in FIG. 10A and FIG. 10B, a shield gap film 24 is formed on the bottom shield layer 23 by depositing, for example, alumina of about 100–200 nm in thickness. Next, an MR film 25 for forming a GMR element or an MR element for reproduction is formed in thickness of tens of nanometers on the shield gap film 24, and is made to be in a desired shape by photolithography with high precision. Next, a shield gap film 26 is formed on the shield gap film 24 and the MR film 25, and the MR film 25 is buried in the shield gap films 24 and 26.

Further, a top shield-cum-bottom pole (called bottom pole in the following) 27 made of, for example, permalloy (NiFe) is formed in thickness of about 3–4 μm on the shield gap film 26. The bottom pole 27 corresponds to an example of the first pole and the first magnetic layer of the invention.

Next, as shown in FIG. 11A and FIG. 11B, after selectively forming a resist pattern for determining the throat height by photolithography, a concave area 27a of about 1.0 μm in depth is formed in the bottom pole 27 by performing ion milling with Ar (argon) using the resist pattern as a mask.

Next, as shown in FIG. 12A and FIG. 12B, an insulating film of about 1–2 μm in thickness such as an alumina film 28 is formed on the bottom pole 27 by sputtering method or CVD method.

Next, as shown in FIG. 13A and FIG. 13B, the surface of the bottom pole 27 is exposed through over-etching of about 0.1–0.3 μm by CMP method so that the surface of the bottom pole 27 is flattened. Through this procedure, an insulating layer 28a which determines the apex angle and the throat height is formed being buried in the gap 27a of the bottom pole 27. The insulating layer 28a may be formed with other insulating materials such as silicon dioxide ($SiO_2$), nitride silicon (SiN) and so on besides alumina.

Next, as shown in FIG. 14A and FIG. 14B, a write gap layer 29 made of an insulating material of about 0.1–0.3 μm in thickness such as alumina is formed on the bottom pole 27 and the insulating layer 28a by, for example, sputtering method. Further, a magnetic pole layer 30 of about 2–4 μm in thickness is formed on the write gap layer 29 by, for example, sputtering method. The magnetic layer 30, as will be described later, serves as the pole tip which determines the track width of a recording head. The magnetic pole layer 30, in the embodiment, is formed with high saturation flux density materials (Hi-Bs materials) such as permalloy (NiFe), FeN, FeZrNP, CoFeN and so on. After that, an inorganic insulating film 31 of about 0.5.–1.0 μm in thickness, such as an alumina film or a silicon dioxide film as the etching mask material for forming the pole tip is formed by, for example, sputtering method.

Next, as shown in FIG. 15A and FIG. 15B, a seed layer 32 of about 50 nm in thickness for plating is formed on the inorganic insulating film 31. Further, if, the measurement precision is required when forming the pole tip to half-micron or submicron measurement, a pattern of a photoresist film 33 is formed on the seed layer 32 by photolithography for enabling the measurement precision. After that, plating layers 34a and 34b (first mask) made of permalloy (NiFe) of about 0.5–1.0 μm in thickness is selectively formed on the seed layer 32 by electro plating method using the photoresist film 33 as a mask. Though electro plating method is used here, plating layers may be formed by electroless plating method with NiB, NiP, NiWB, NiWP and so on instead of permalloy. The seed layer is not required in this case.

Next, as shown in FIG. 16A and FIG. 16B, the photoresist film 33 is removed.

Figures 17A, 17B:
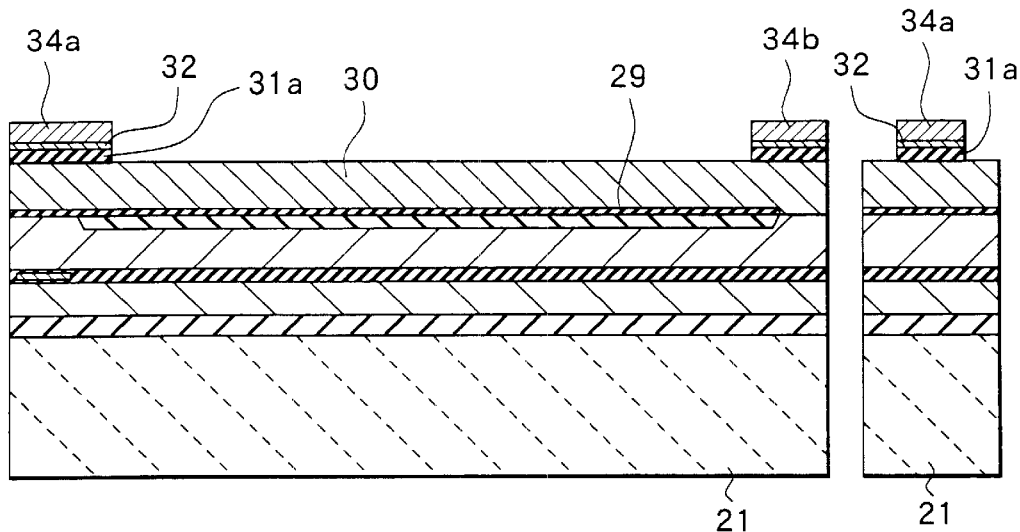
FIG. 17A and FIG. 17B are cross sections for describing a procedure following FIG. 16A and FIG. 16B.

Next, as shown in FIG. 17A and FIG. 17B, an inorganic insulating mask 31a (second mask) is formed by selectively removing the inorganic insulating film 31 by RIE using the plating layers 34a and 34b as a mask after selectively removing the seed layer 32 by, for example, ion milling with Ar using the plating layers 34a and 34b as a mask.

Figures 18A, 18B:
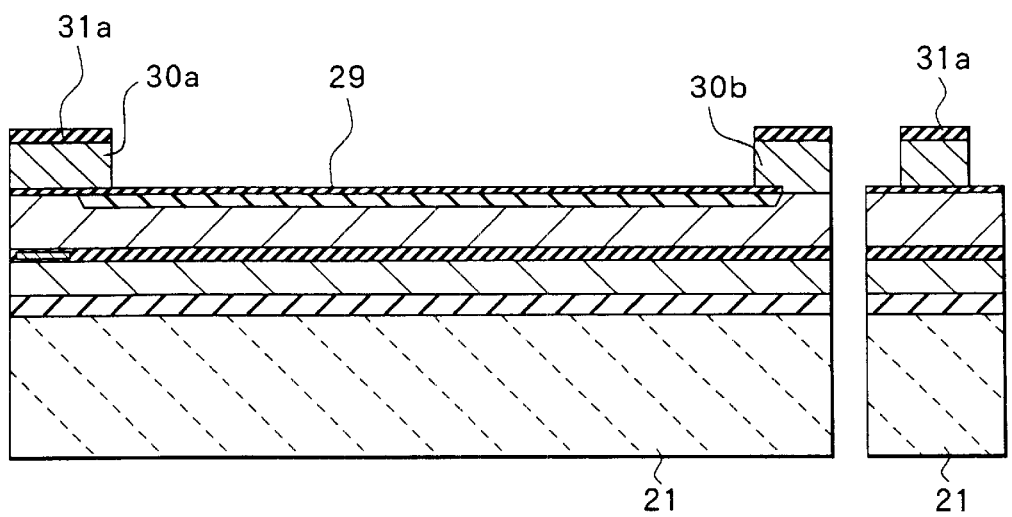
FIG. 18A and FIG. 18B are cross sections for describing a procedure following FIG. 17A and FIG. 17B.

Next, as shown in FIG. 18A and FIG. 18B, the magnetic layer 30 is selectively removed by, for example, ion milling with Ar (argon) using the inorganic insulating mask 31a. Through this procedure, a pole tip 30a and a connecting portion pattern 30b for connecting the top pole and the bottom pole are formed. The bottom pole 27 and a top pole 39 which is to be described later are connected by the connecting portion pattern 30b so that forming a through-hole after the CMP procedure which is to be described later becomes easier. The pole tip 30a corresponds to an example of the second magnetic pole of the invention.

Figures 19A, 19B:
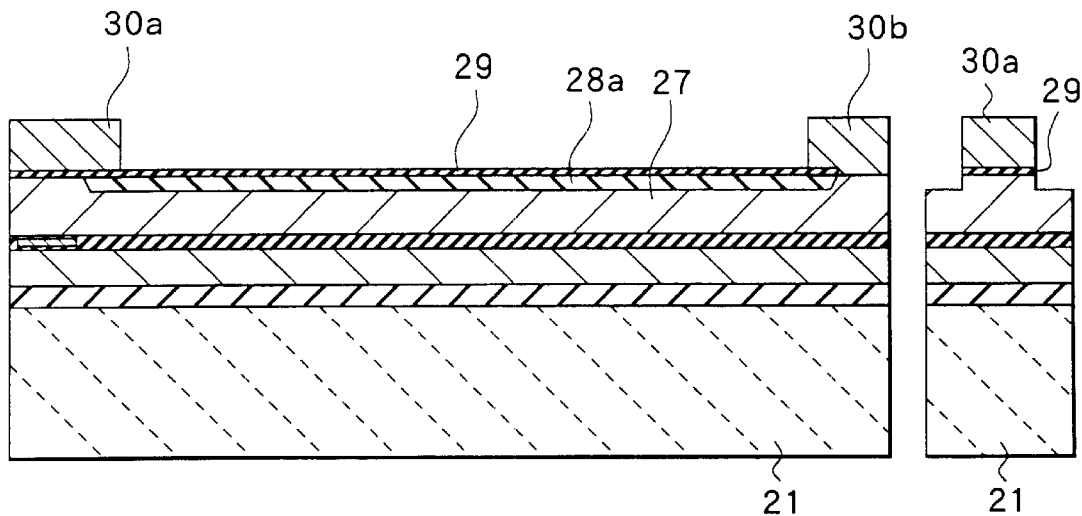
FIG. 19A and FIG. 19B are cross sections for describing a procedure following FIG. 18A and FIG. 18B.

Further, as shown in FIG. 19A and FIG. 19B, using the pole tip 30a as a mask, its peripheral area of the write gap layer 29 is etched in a self-aligned manner. That is, a recording track with a trim structure is formed through etching the exposed bottom pole 27 about 0.5 μm by, for example, ion milling with Ar after selectively removing the write gap layer 29 by RIE with chlorine gas ($Cl_2$, $CF_4$ and so on) using the inorganic insulating mask 31a and the pole tip 30a as a mask.

Figures 20A, 20B:
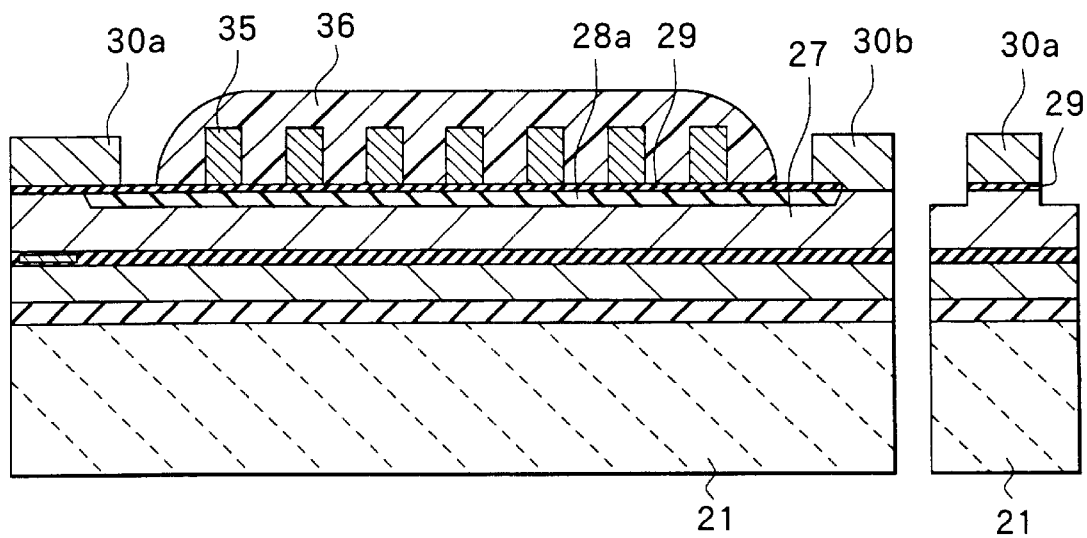
FIG. 20A and FIG. 20B are cross sections for describing a procedure following FIG. 19A and FIG. 19B.

Next, as shown in FIG. 20A and FIG. 20B, a first layer of a thin film coil 35 for an inductive-type recording head, made of, for example, copper (Cu) of about 2–3 μm in thickness is formed on the recording gap layer 29 by, for example, electro plating method. Further, a photoresist film 36 is formed in a desired pattern on the recording gap layer 39 and the thin film coil 35 by photolithography with high precision. Next, a heat treatment of, for example, 250° C. is applied so as to flatten the thin film coil 35 and to isolate the turns of the thin film coil 36 from each other.

Figures 21A, 21B:
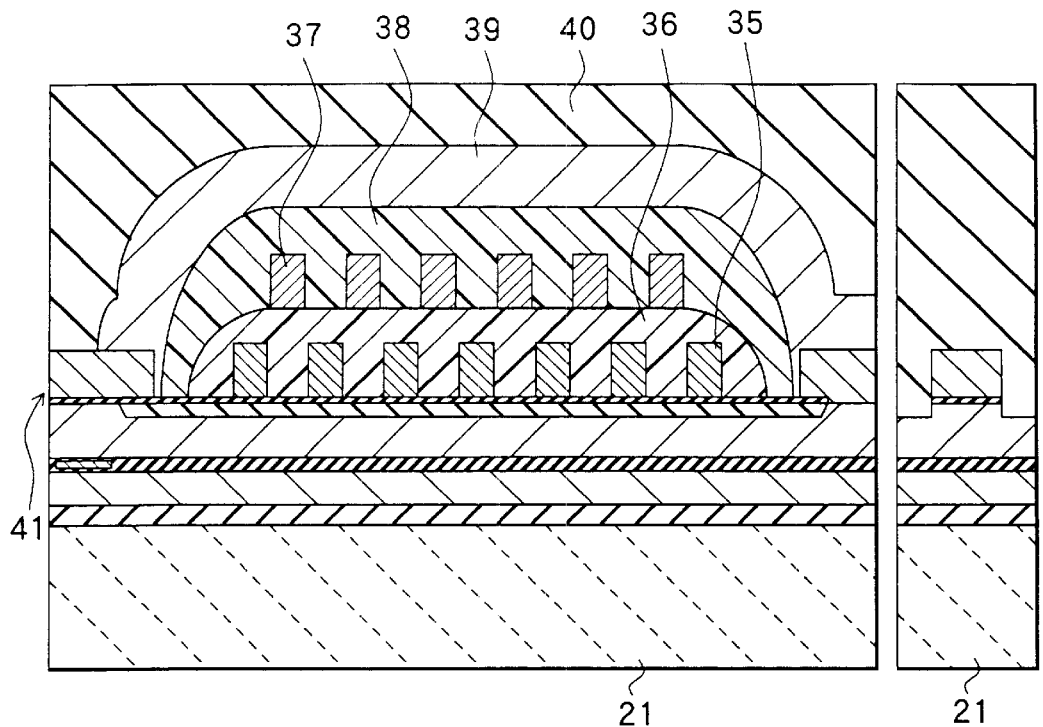
FIG. 21A and FIG. 21B are cross sections for describing a procedure following FIG. 20A and FIG. 20B.

Next, as shown in FIG. 21A and FIG. 21B, a second layer of a thin film coil 37 made of, for example copper of about 2–3 μm in thickness is formed on the photoresist film 36 by, for example, electro plating method. Next, a photoresist film 38 is formed in a predetermined pattern on the photoresist film 36 and the thin film coil 37 by photolithography with high precision, and a heat treatment of, for example, 250° C. is applied so as to flatten the thin film coil 37 and to isolate the turns of the thin film coil 37 from each other. Further, a top pole (yoke) 39 of about 3–5 μm in thickness is formed. The top pole 39 may be formed with, for example, NiFe (50 weight percentage: 50 weight percentage) made through electro plating method or high saturation flux density (Hi-Bs) materials made through sputtering method. The top pole 39 corresponds to an example of the second magnetic layer of the invention as well. The top pole 39 has a contact with, and is magnetically coupled to the bottom pole 27 through a dummy pattern 30b in the rear position of the thin film coils 35 and 37. Further, an over coat layer 40 made of alumina is formed on the top pole 39 by, for example, sputtering method. Finally, a thin film magnetic head is completed after forming a track surface (ABS, air bearing surface) 41 of the recording head and the reproducing head through performing slider machine processing.

As described above, in the embodiment, the inorganic insulating mask 31a is used as an etching mask of the magnetic layer (magnetic pole layer 30) instead of using photoresist in the related art, while the inorganic insulating mask 31a is formed by RIE but not by ion milling. As a result, the same effect as that of the first and second embodiments such as forming the track (pole tip 30a) of the recording head to submicron measurement with high precision in a short time can be obtained. Accordingly, in the thin film magnetic head implemented through the embodiment, high surface density recording by the recording head becomes possible.

Further, the magnetic layer such as the pole tip 30a and so on are formed with high saturation flux density (Hi-Bs) materials so that the magnetism generated in the thin film coils 35 and 37 effectively reaches the pole tip 30a without being saturated on the way, even if the track width is narrow. As a result, a recording head without magnetic loss can be implemented with the embodiment.

Further, in the embodiment, as evident in FIG. 21A and FIG. 21B, the top pole (yoke) 39 is magnetically connected to the pole tip 30a in a position recessed form the track surface 41. That is, in the track surface 41, the top pole 39 is not exposed on the pole tip 30a unlike the related art. Accordingly, poor write by the top pole 39 does not occur and the track width can be determined with the pole tip 30a. As a result, when writing to the hard disk, a problem of accidentally writing to the neighboring track does not occur so that the writing characteristic such as flux rise time and so on can be improved.

Further, effects such as follows can be obtained with the embodiment. That is, in the related art, since the thin film coils are formed on the insulating layer, when a coil is formed to two or three layers to improve the performance of the recording head, the apex angle θ becomes larger so that the track width of the recording head can not be made narrower. In contrast, in the embodiment, the insulating layer 28a made of alumina is buried in the bottom pole 27, and the insulating layer 28a makes the same surface as the surface of the bottom pole 27 so that the pole tip 30a is formed in a flat area. Accordingly, with the effects obtained through etching using the inorganic insulating mask, the track width of the recording head can be easily micronized to 1.0 µm, 0.5 µm, 0.25 µm in and so on.

Further, in the embodiment, the insulating layer 28a which determines the throat height is buried in the concave area 27a of the bottom pole 27 so that a pattern shift and profile deterioration of the edge frame of the insulating layer 28a do not occur. As a result, precise control of the throat height becomes possible. Further, precise control of the MR height and the apex angle becomes possible as well.

Further, in the embodiment, a pattern shift of the insulating layer 28a does not occur when etching the seed layer for forming the thin film coil by plating method or etching the write gap layer 29 and the bottom pole 27 for forming the trim structure, since the insulating layer 28a is buried in the bottom pole 27. Also, as a result, precise control of the throat height becomes possible.

Further, the thick insulating layer 28a is formed between the thin film coils 35,37 and the top shield (that is, bottom pole 27) so that a large insulation pressure resistance can be obtained between the thin film coils 35, 37 and the top shield and flux leakage from the thin film coils 35 and 37 can be decreased at the same time.

As described above, with the embodiment, micronization of the track width is possible while the time required for etching is significantly shortened. In addition, manufacturing of a thin film magnetic head with a high-performance narrow track structure in which the throat height, the MR height and the apex angle are controlled precisely while increase of the effective track width by spread of the magnetic flux generated while writing to the narrow track can be suppressed becomes possible.

Fourth Embodiment

Next, a method of manufacturing a composite thin film magnetic head according to a fourth embodiment of the invention will be described with reference to FIG. 22A and FIG. 22B to FIG. 24A and FIG. 24B. The embodiment is a method which enables improvement of the flux rise time and the non-linear transition shift (NLTS) by providing a thick insulating film in the vicinity of the throat height. Further, in the embodiment, the procedure through FIG. 9A and FIG. 9B to FIG. 18A and FIG. 18B will be omitted since it is identical to that of the third embodiment, and the following procedure will be described. Further, in FIG. 22A and FIG. 22B to FIG. 24A and FIG. 24B, "A"s show cross sections vertical to the track surface and "B"s show cross sections parallel to the track surface of the magnetic pole portion.

Figures 22A, 22B:
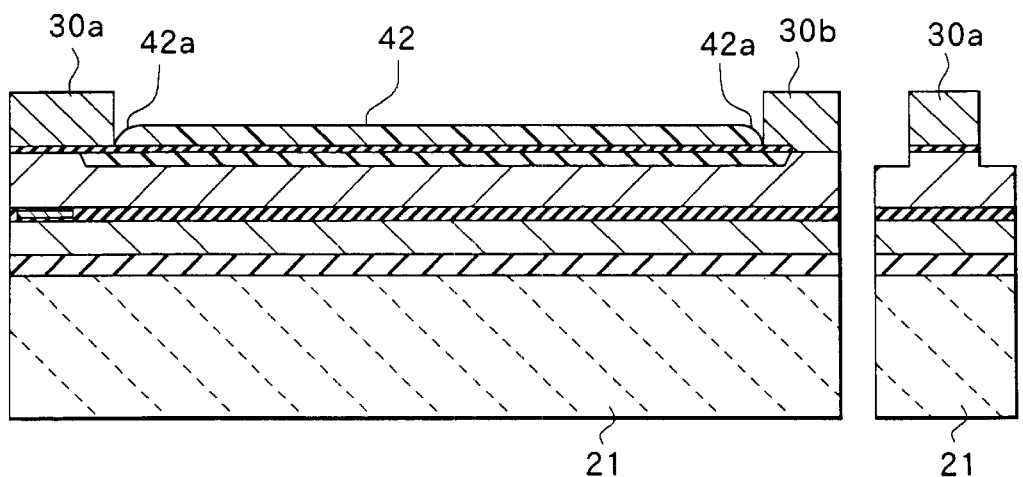
FIG. 22A and FIG. 22B are cross sections for describing a procedure following FIG. 21A and FIG. 21B.

In the embodiment, as shown in FIG. 22A and FIG. 22B, a pattern of a photoresist film 42 of about 1.0–1.5 µm in thickness is formed in the vicinity of the pole tip 30a. Further, annealing of 20° C. is applied so that a pattern edge 42a of the photoresist film 42 takes a round-shape.

Figures 23A, 23B:
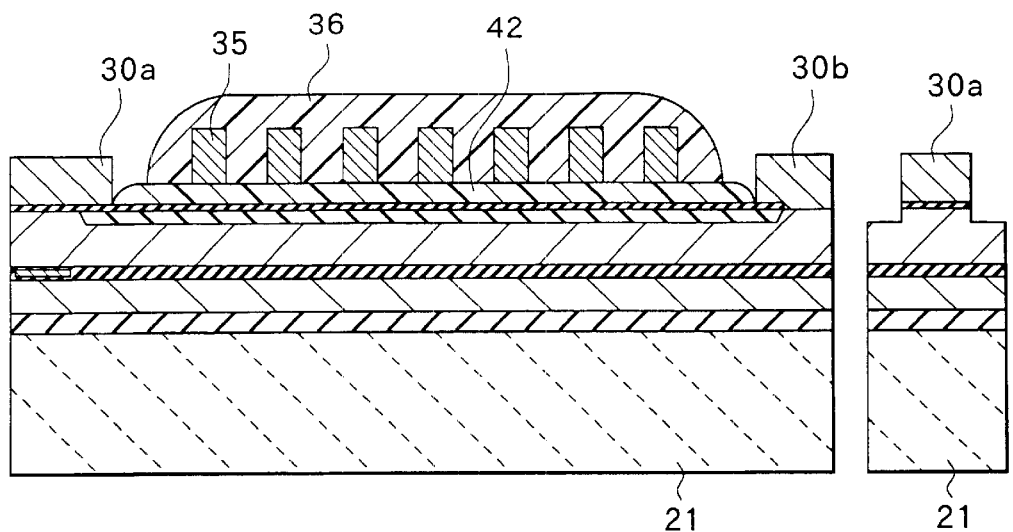
FIG. 23A and FIG. 23B are cross sections for describing a procedure following FIG. 22A and FIG. 22B.

The following procedure is identical to that of the third embodiment. That is, as shown in FIG. 23A and FIG. 23B, a first layer of the thin film coil 35 for an inductive-type recording head made of, for example, copper (Cu) of 2–3 µm in thickness is formed on the photoresist film 42 by, for example, electro plating method. Further, a photoresist film 36 is formed in a predetermined pattern on the photoresist film 42 and the thin film coil 35 by photolithography with high precision. Next, a heat treatment of, for example, 250° C. is applied so as to flatten the thin film coil 35 and isolate the turns of the thin film coil 36 from each other.

Figures 24A, 24B:
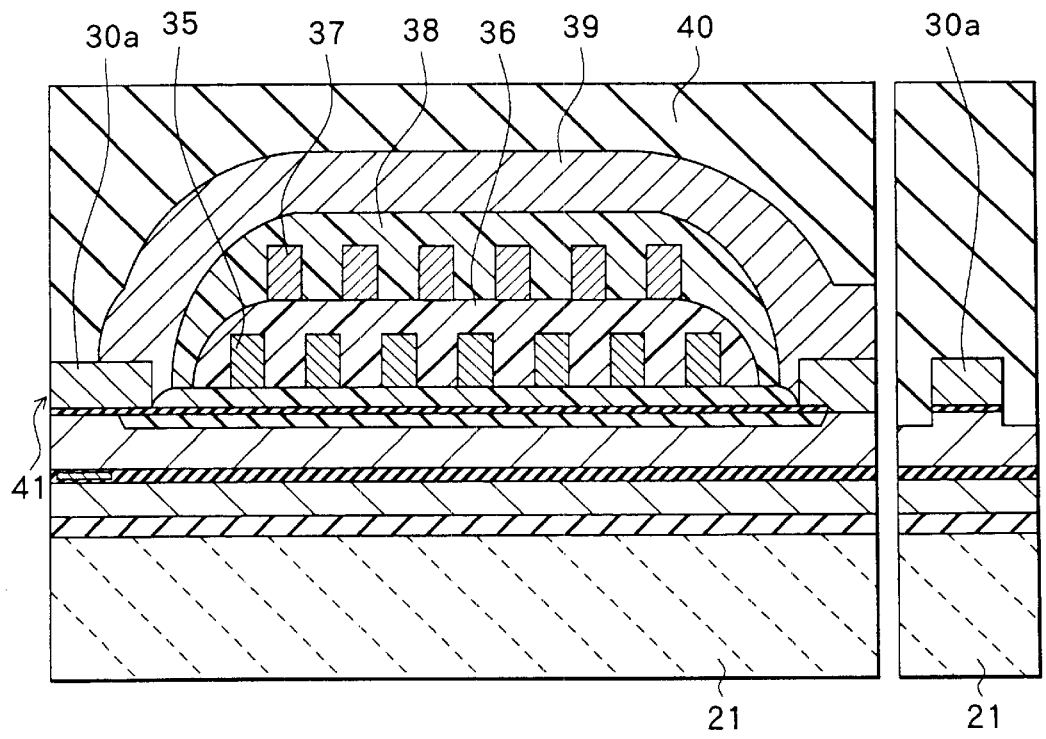
FIG. 24A and FIG. 24B are cross sections for describing a procedure following FIG. 23A and FIG. 23B.

Next, as shown in FIG. 24A and FIG. 24B, a second layer of the thin film coil 37 made of, for example, copper of 2–3 µm in thickness is formed on the photoresist film 36 by, for example, electro plating method. Next, a photoresist film 38 is formed in a predetermined pattern on the photoresist film 36 and the thin film coil 37 by photolithography with high precision and is treated with heat at, for example, 250° C. so as to flatten the thin film coil 37 and isolate the turns of the thin film coil 37 from each other. Further, a top pole 39 of about 3–5 μm in thickness is formed. Further, an over coat layer 40 made of, for example, alumina is formed on the top pole 39. Finally, a thin film magnetic head is completed after forming a track surface 41 of the recording head and the reproducing head by performing a machine processing on a slider.

Other constitutions, operations and effects of the embodiment are identical to those of the third embodiment.

Figure 25:
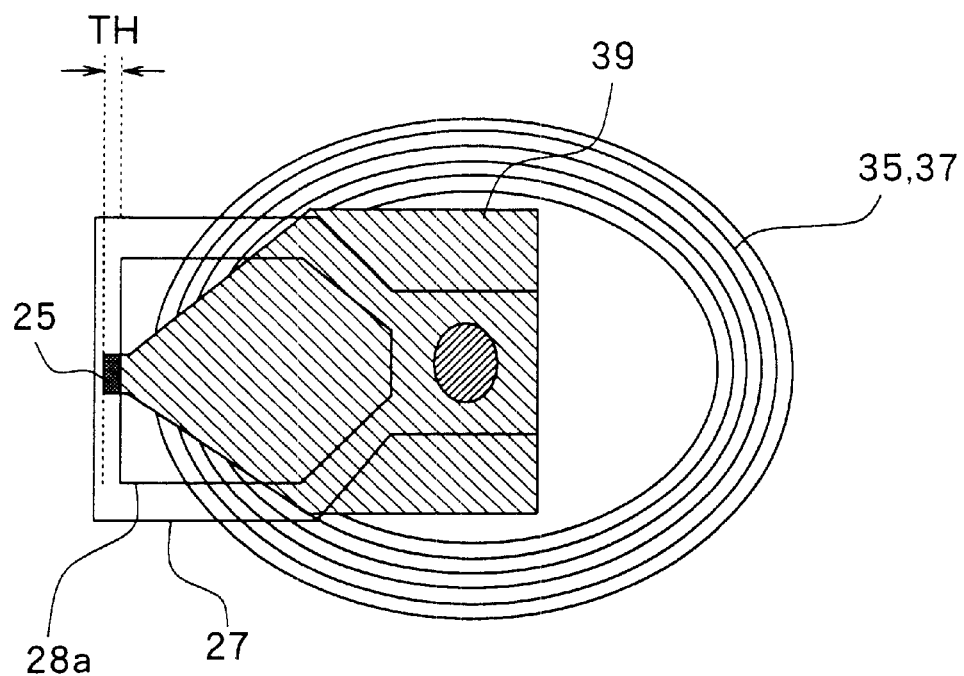
FIG. 25 is a plan view of a thin film magnetic head manufactured through a manufacturing method according to the third embodiment of the invention.
Figure 26:
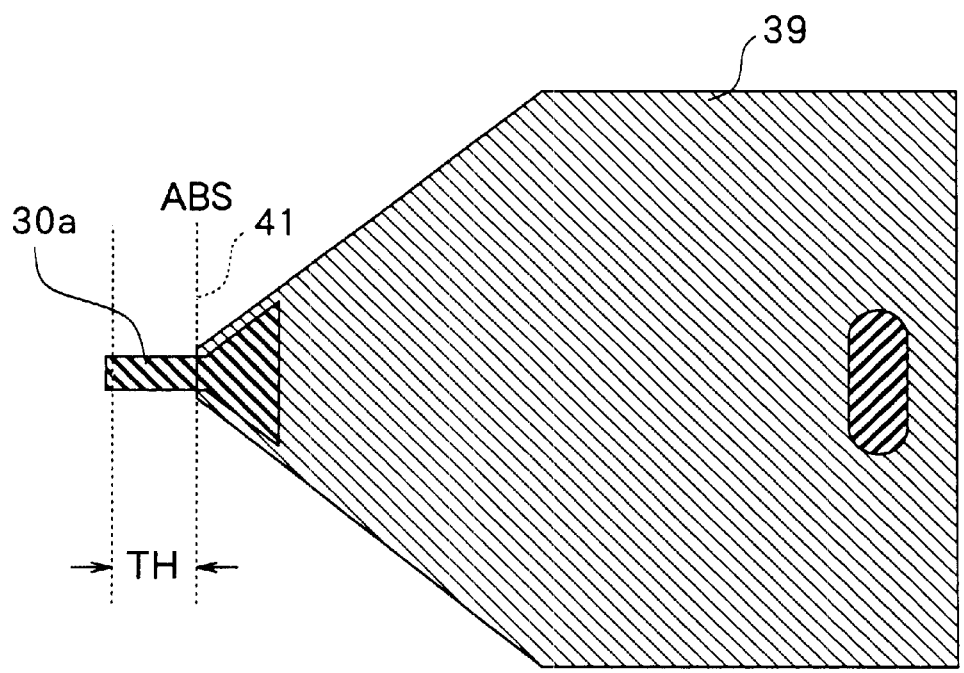
FIG. 26 is a plan view showing specifically the pole tip and the top pole of the thin film magnetic head shown in FIG. 25.

Further, FIG. 25 is a plan view of a thin film magnetic head manufactured through a manufacturing method according to the third or the fourth embodiment, and FIG. 26 is a plan view specifically showing the pole tip 30a and the top pole 39 of the thin film magnetic head. Further, in FIG. 25, the over coat layer 40 is omitted. In the figure, TH represents throat height, and the throat height TH is determined by the magnetic-pole-side edge frame of the insulating layer 28a buried in the bottom pole 27 as described.

Fifth Embodiment

Figures 27A, 27B:
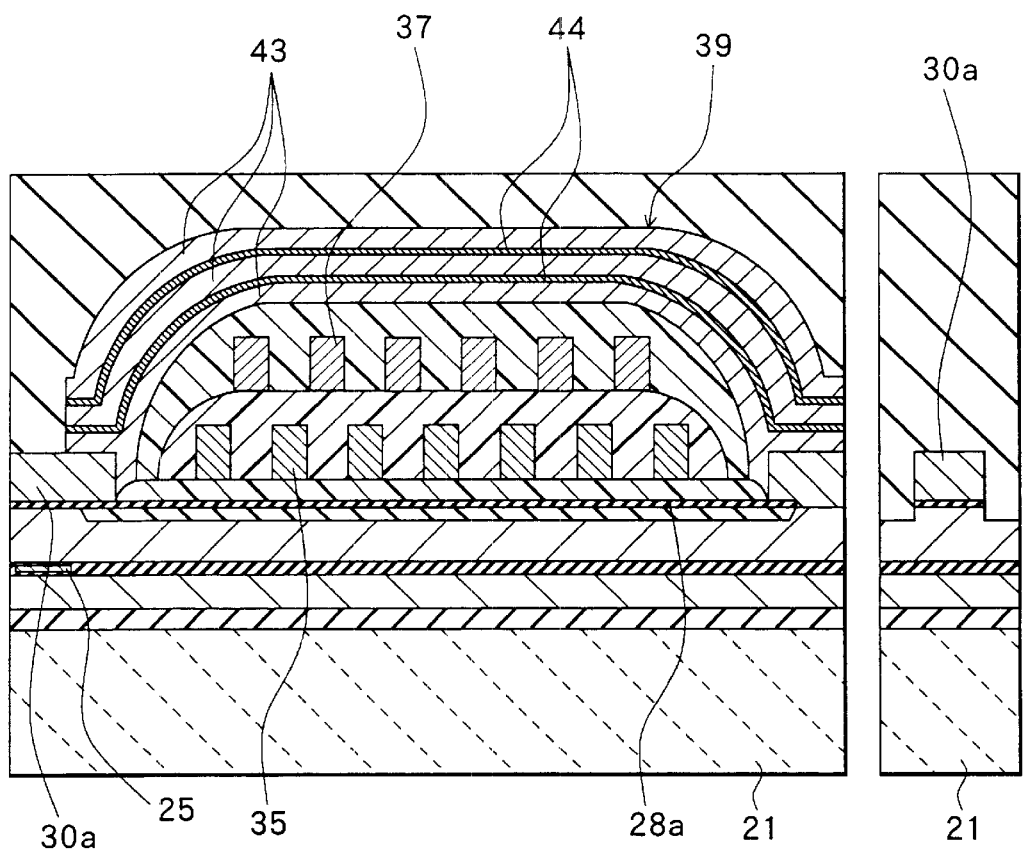
FIG. 27A and FIG. 27B are plan views showing a constitution of a thin film magnetic head of a laminated yoke-pole type according to the fourth embodiment of the invention.
Figure 28A:
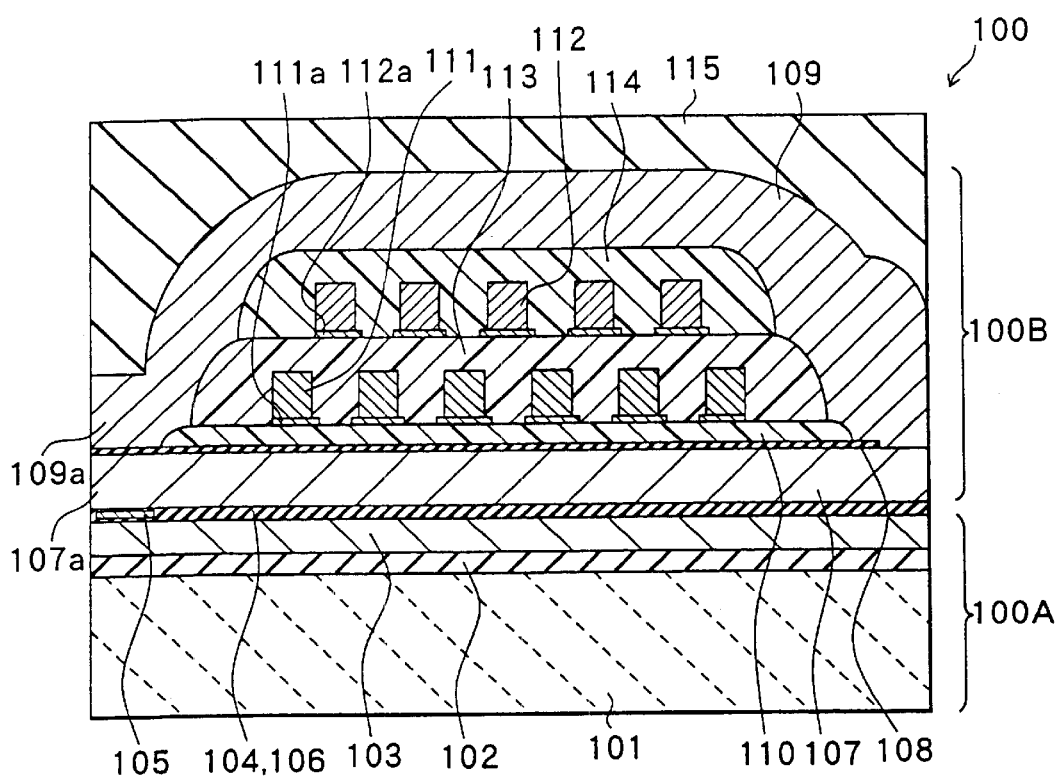
FIG. 28A and FIG. 28B are cross sections showing a constitution of a thin film magnetic head of the related art.
Figure 28B:
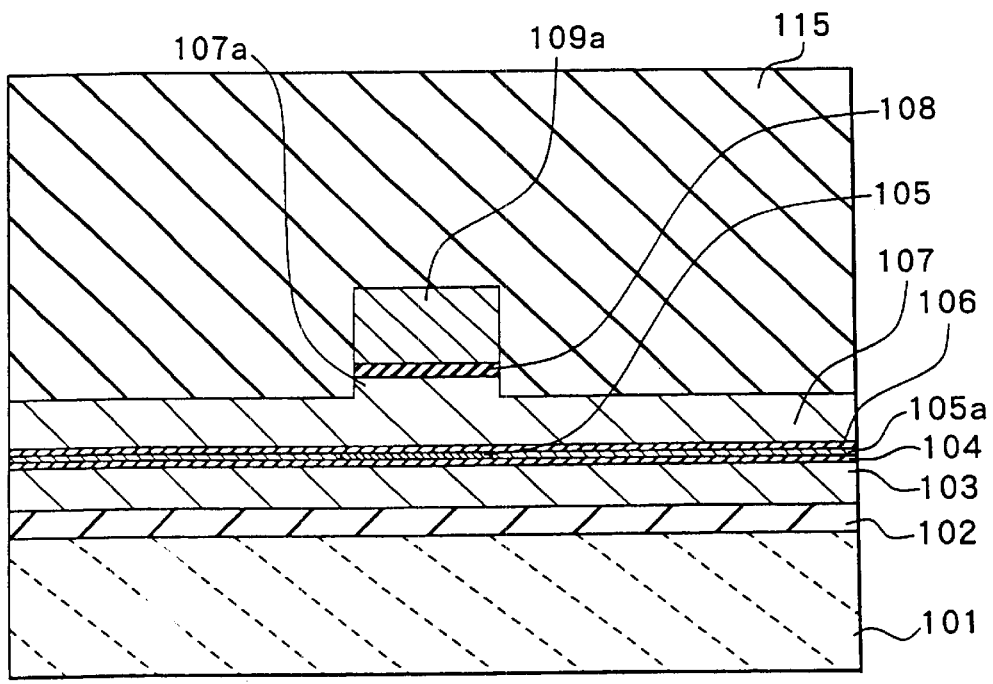
Figures 33A, 33B:
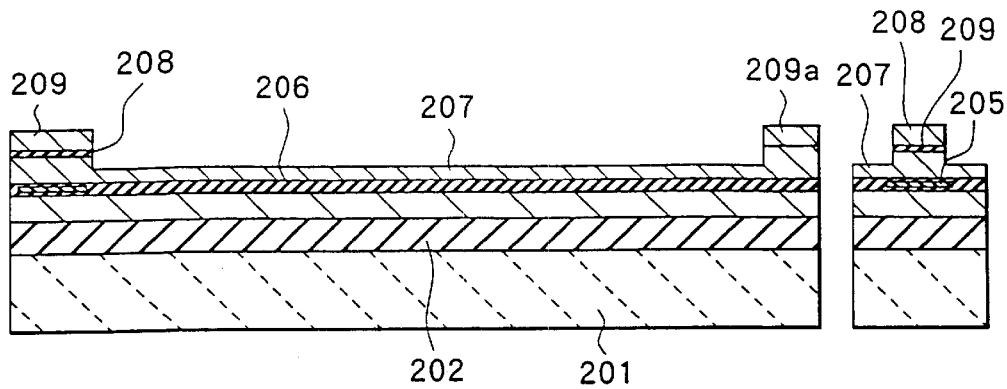
FIG. 33A and FIG. 33B are cross sections for describing a procedure following FIG. 32A and FIG. 32B.
Figures 34A, 34B:
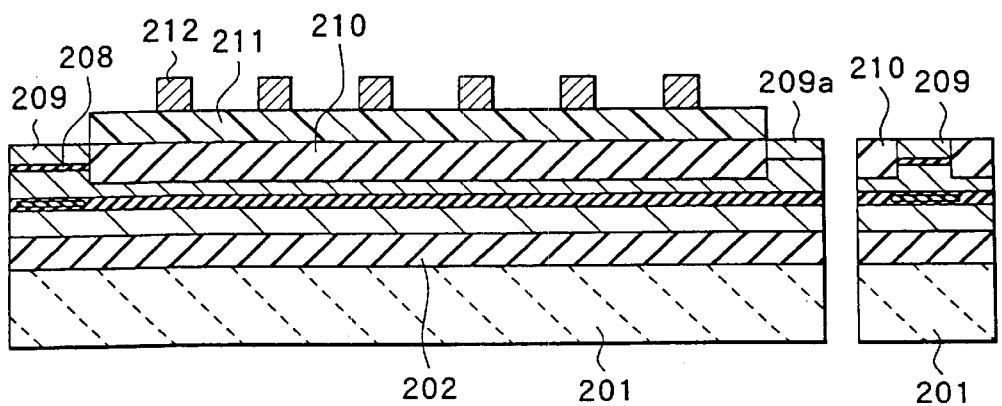
FIG. 34A and FIG. 34B are cross sections for describing a procedure following FIG. 33A and FIG. 33B.
Figures 35A, 35B:
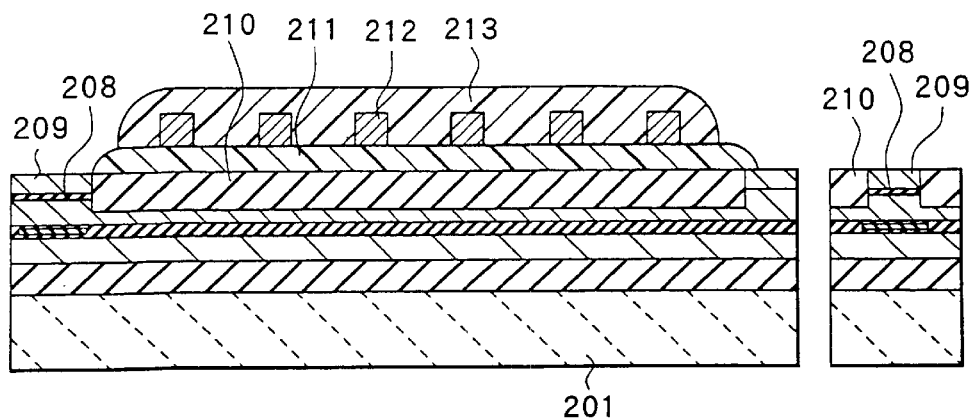
FIG. 35A and FIG. 35B are cross sections for describing a procedure following FIG. 34A and FIG. 34B.
Figures 36A, 36B:
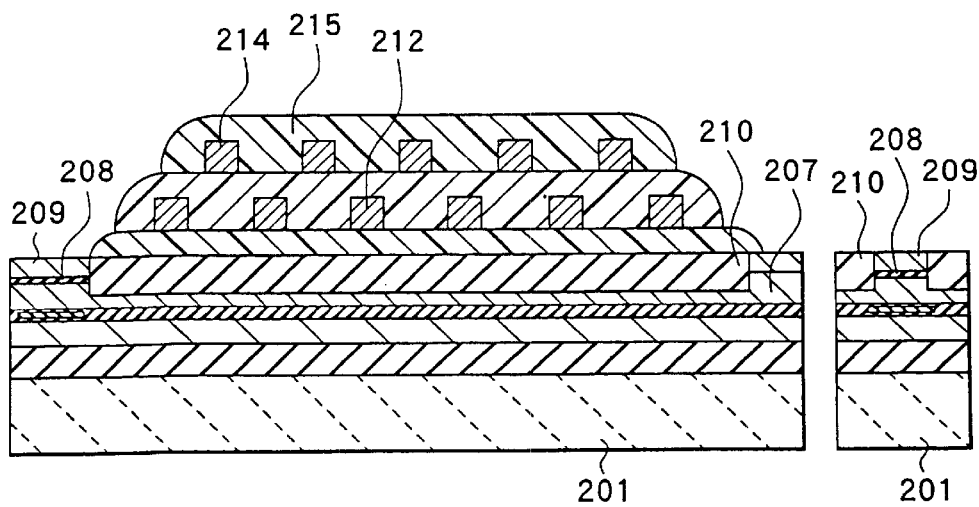
FIG. 36A and FIG. 36B are cross sections for describing a procedure following FIG. 35A and FIG. 35B.
Figures 37, 37B:
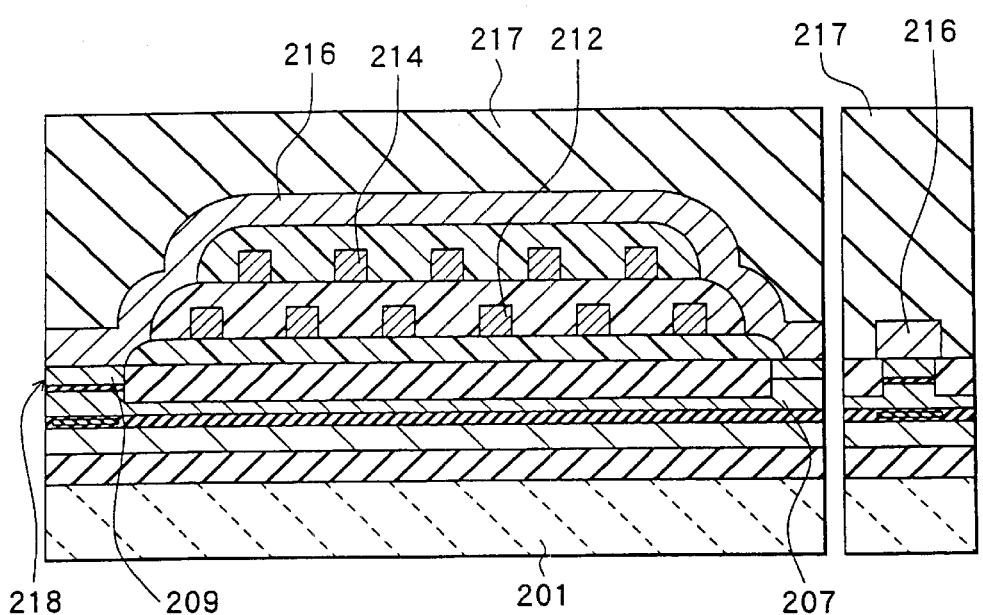
Figure 38:
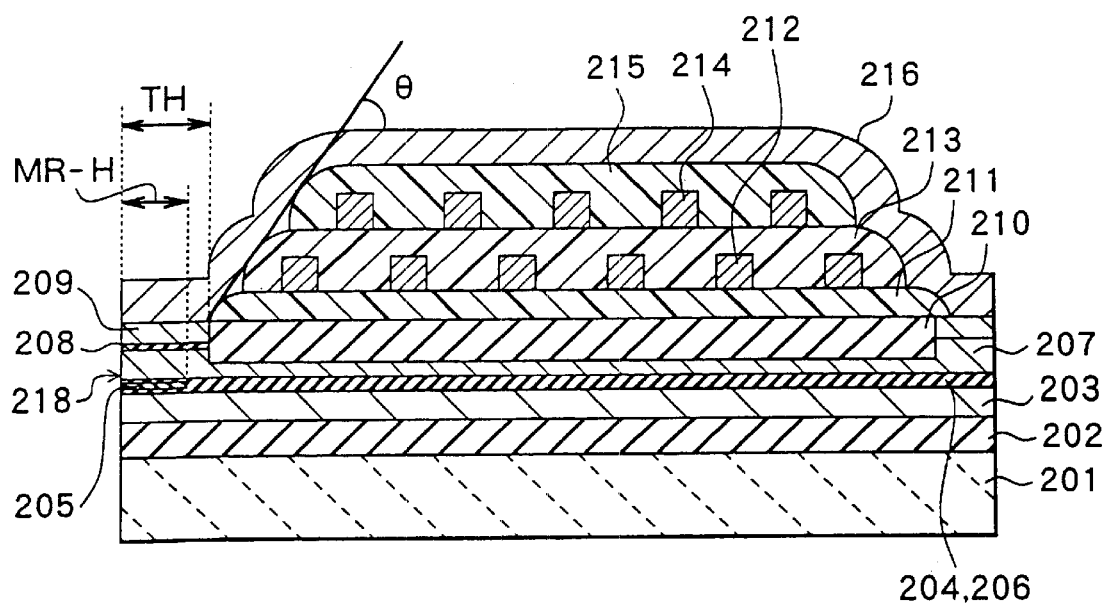
FIG. 38 is a cross section showing a cross section vertical to a track surface in a thin film magnetic head of the related art.
Figure 39:
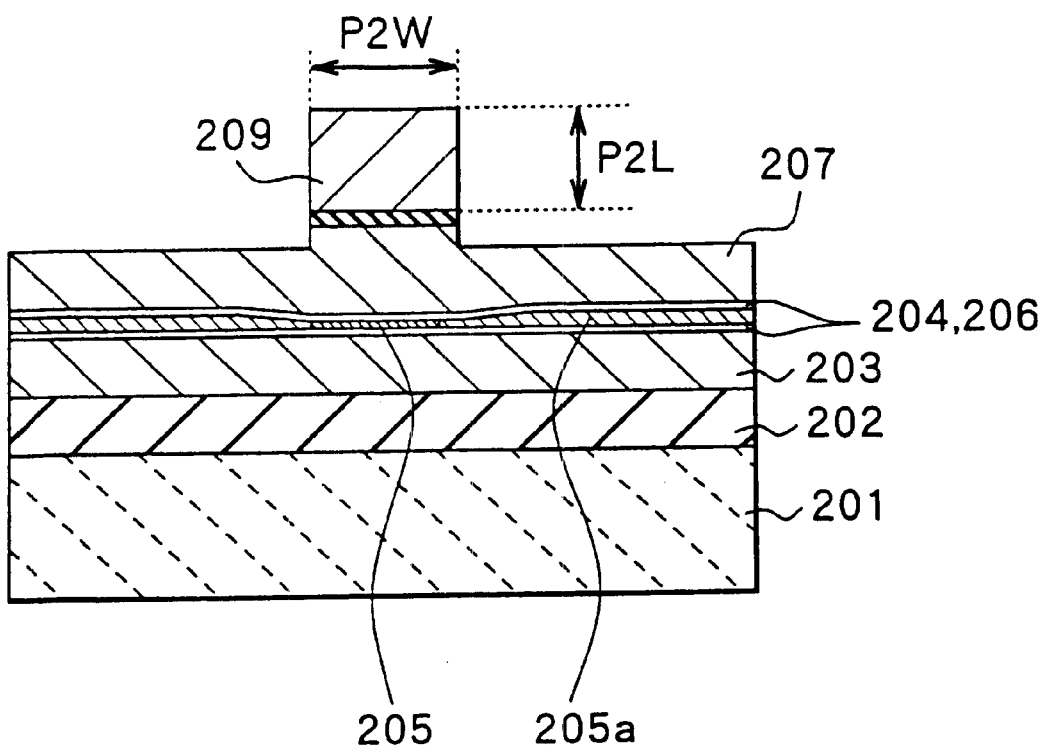
FIG. 39 is a cross section showing a cross section parallel to a track surface of a magnetic pole portion in a thin film head of the related art.

FIG. 27A and FIG. 27B show the constitution of a composite thin film magnetic head according to a fifth embodiment of the invention. The thin film magnetic head comprises a top pole having a laminated structure in which the magnetic films and the gap layers of tens of nanometers are alternately laminated to a plurality of layers. By making the top layer being the laminated structure as described above, eddy current generated in the magnetic path can be suppressed and high-frequency characteristic can be improved.

In the embodiment, the invention is applied when forming the top pole (yoke) 39 having such a laminated structure. That is, after forming an inorganic insulating film 44 as a gap layer on a magnetic film 43, the inorganic insulating film 44 is etched by RIE using the plating layer as a mask. Further, after etching the magnetic film 43 by ion milling using the inorganic insulating film 44 as a mask, performing RIE to the inorganic insulating film 44 and ion milling to the magnetic film 43 is repeated a number of times. Through the procedure described, the top pole 39 having a laminated structure in which the magnetic films are sandwiched by a plurality of gap layers is formed. Further, the specific procedure is substantially identical to that of the embodiments described earlier so that the description will be omitted.

The invention is described by referring to the embodiments, however, it is not limited to the embodiments but various modifications are applicable. For example, in the embodiments described above, examples which use high saturation flux density materials such as FeN, FeCoZr and so on for the top pole besides using, for example, NiFe (Ni: 50 weight percentage, Fe: 50 weight percentage) and NiFe (Ni: 80 weight percentage, Fe: 20 weight percentage) are described, however, a structure of laminating two or more kinds of these materials may be applicable. Further, the bottom pole may have a structure in which NiFe and other high saturation flux density materials are laminated as well. The method of the invention is applicable to etching of such a bottom pole and so on. Further, in the embodiments described above, an example of etching the magnetic layer formed with the high saturation flux density material is described, however, it is applicable to etching of the magnetic layer formed with materials as well other than the high saturation flux density material.

Further, in the embodiments described above, a method of manufacturing a composite thin film magnetic head is described. The invention can be applied to manufacturing of a thin film magnetic head for recording only having an inductive-type magnetic transducer for writing, and to manufacturing of a thin film magnetic head for both recording and reproducing. Further, the invention can be applied to manufacturing of a thin film magnetic head having a structure in which the order of laminating the element for writing and the element for reading out is exchanged as well.

As described above, in a method of etching a magnetic layer, a method of forming a magnetic pole of a thin film magnetic head and a method of manufacturing a thin film magnetic head of the invention, an inorganic insulating film (second mask) is made to be formed by reactive ion etching using a first mask made of a photoresist film or a plating film, and the magnetic layer is made to be etched using the second mask. As a result, effects that the magnetic layer can be processed to micro-measurement with high precision while etching speed becomes faster and throughput is improved.

What is claimed is:

1. A method of etching a magnetic layer for processing a magnetic layer in a desired shape including the steps of:

forming an inorganic insulating film made of aluminum oxide on a surface of the magnetic layer;

forming a first mask on a surface of the inorganic insulating film, the first mask being a plating film;

forming a second mask by selectively removing the inorganic insulating film made of aluminum oxide through reactive ion etching using the first mask;

removing the magnetic layer selectively using the second mask; and removing the first mask and the second mask.

2. A method of etching a magnetic layer according to claim 1 wherein a magnetic layer is formed with a magnetic material with high saturation flux density.

3. A method of etching a magnetic layer according to claim 2 wherein the magnetic layer is etched by ion milling method.

* * * * *